(12) United States Patent
Leshem et al.

(10) Patent No.: US 11,354,627 B2
(45) Date of Patent: Jun. 7, 2022

(54) REHABILITATION CASE MANAGEMENT SOFTWARE

(71) Applicants: Oron Leshem, Givat Ada (IL); Yaacov Hiki, Tirat Hacarmel (IL)

(72) Inventors: Oron Leshem, Givat Ada (IL); Yaacov Hiki, Tirat Hacarmel (IL)

(73) Assignee: UMAN2U LTD, Givat-Ada (IL)

( * ) Notice: Subject to any disclaimer, the term of this patent is extended or adjusted under 35 U.S.C. 154(b) by 16 days.

(21) Appl. No.: 16/278,201

(22) Filed: Feb. 18, 2019

(65) Prior Publication Data

US 2019/0258701 A1 Aug. 22, 2019

Related U.S. Application Data

(60) Provisional application No. 62/633,088, filed on Feb. 21, 2018.

(51) Int. Cl.
*G06Q 10/10* (2012.01)
*G06F 40/166* (2020.01)
*G06F 40/30* (2020.01)
*G06F 40/143* (2020.01)

(52) U.S. Cl.
CPC ....... *G06Q 10/1097* (2013.01); *G06F 40/143* (2020.01); *G06F 40/166* (2020.01); *G06F 40/30* (2020.01)

(58) Field of Classification Search
CPC ...................................................... G06F 17/22
See application file for complete search history.

(56) References Cited

U.S. PATENT DOCUMENTS

| | | | |
|---|---|---|---|
| 2004/0162833 A1* | 8/2004 | Jones et al. | G06F 7/00 |
| 2006/0271400 A1* | 11/2006 | Clements et al. | G06Q 10/00 |
| 2010/0274576 A1* | 10/2010 | Young | G06Q 50/00 |
| 2012/0036125 A1* | 2/2012 | Al-Kofahi et al. | G06F 17/30 |
| 2012/0277594 A1* | 11/2012 | Proyer | H04N 7/18 |
| 2014/0074509 A1* | 3/2014 | Amarasingham et al. G06F 19/00 |  |
| 2015/0161330 A1* | 6/2015 | Joao et al. | G06F 19/322 |
| 2016/0342590 A1* | 11/2016 | Paulin | G06F 17/30011 |
| 2018/0101659 A1* | 4/2018 | Ninan et al. | G06F 19/3431 |
| 2019/0101659 A1* | 4/2019 | Ninan et al. | G06F 19/3431 |

* cited by examiner

*Primary Examiner* — James J Debrow
(74) *Attorney, Agent, or Firm* — Naomi S. Rosenman-Helfand

(57) ABSTRACT

The subject matter discloses a system and a method for handling case management. According to some embodiments the system provides a comprehensive and integrative solution for a rehabilitation process. According to some embodiments the system comprises three main modules:

Personal Details module—including key data on the client;
Background module—catalog and backup of all relevant documents;
Rehabilitation module—individual rehabilitation schemes construction.

18 Claims, 28 Drawing Sheets

Relevant titles Options

Services: Education Background, Work & employment history & rehabilitation, Treatment, Hospitalization background

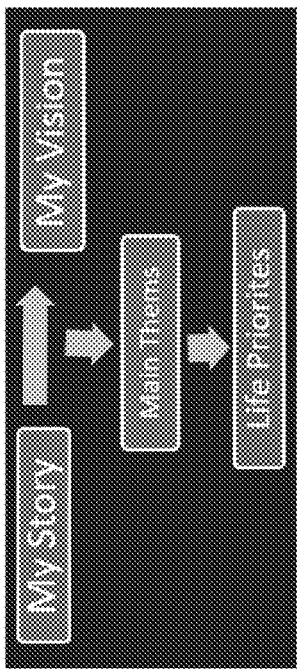
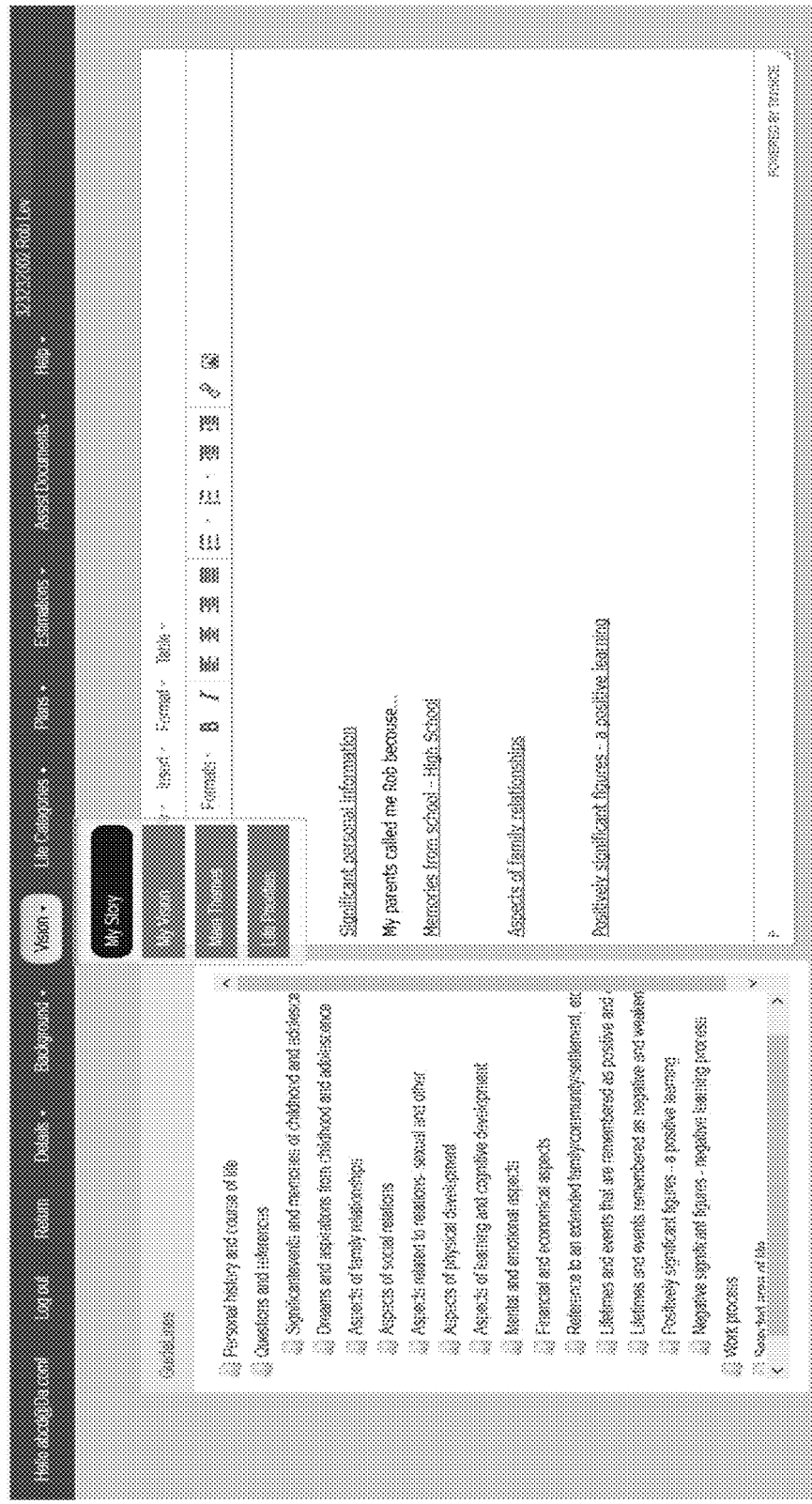
Fig. 12

Fig. 15
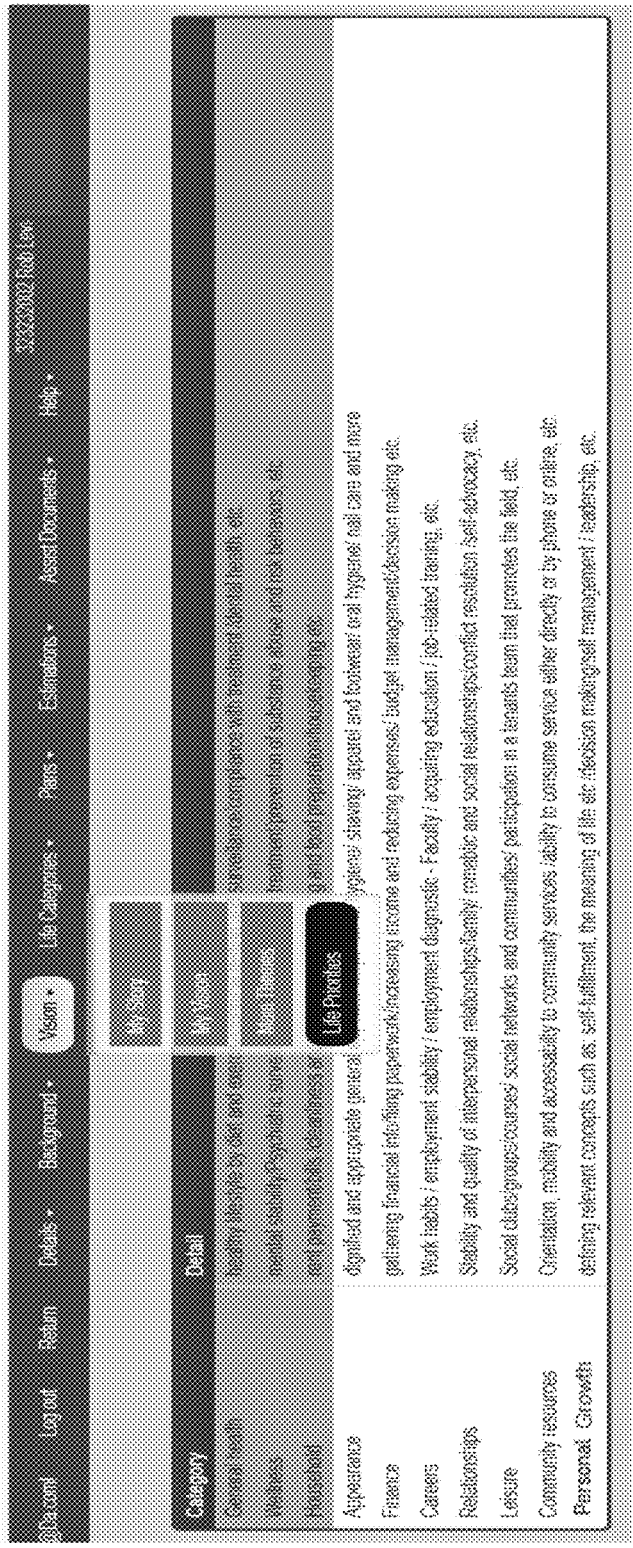
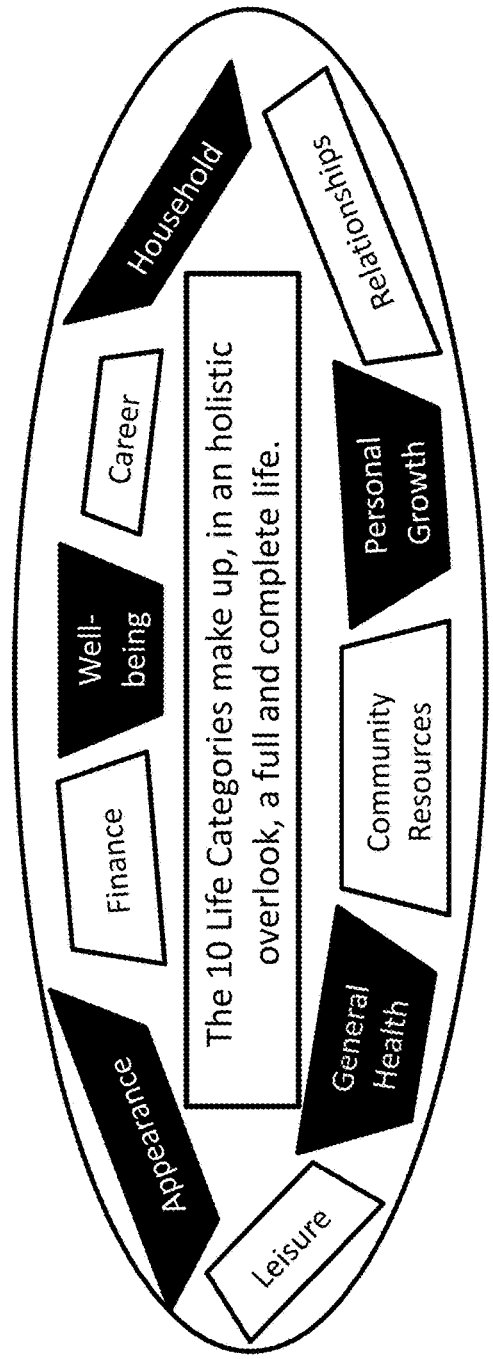

Fig. 17

Fig. 21
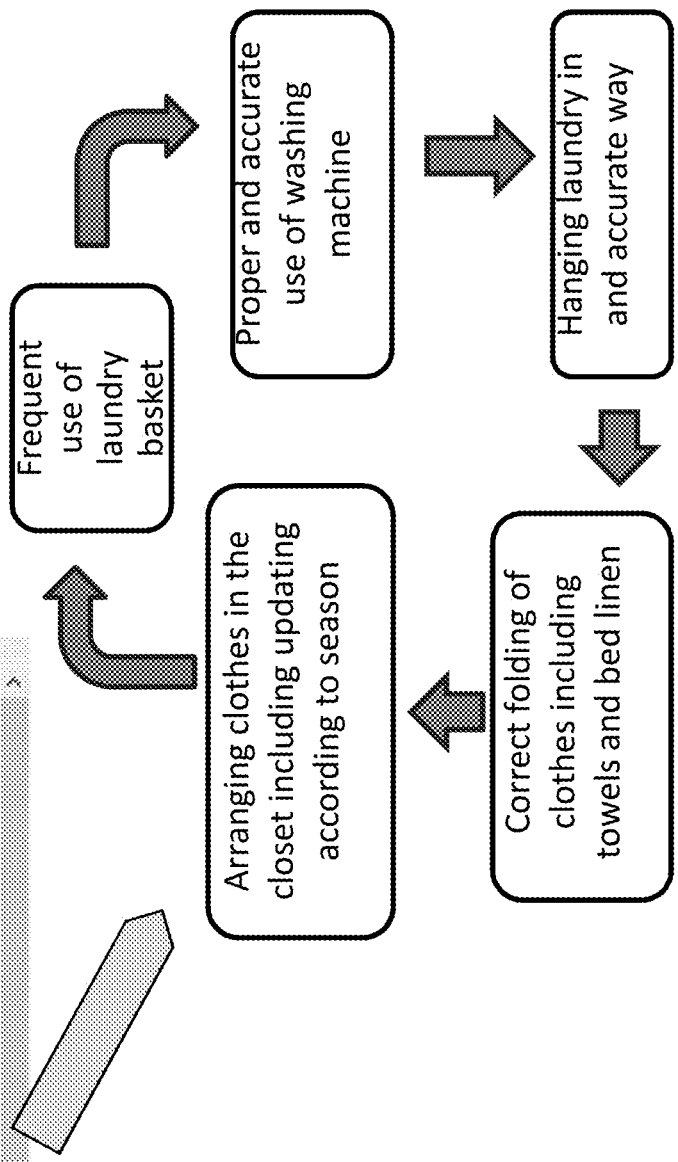
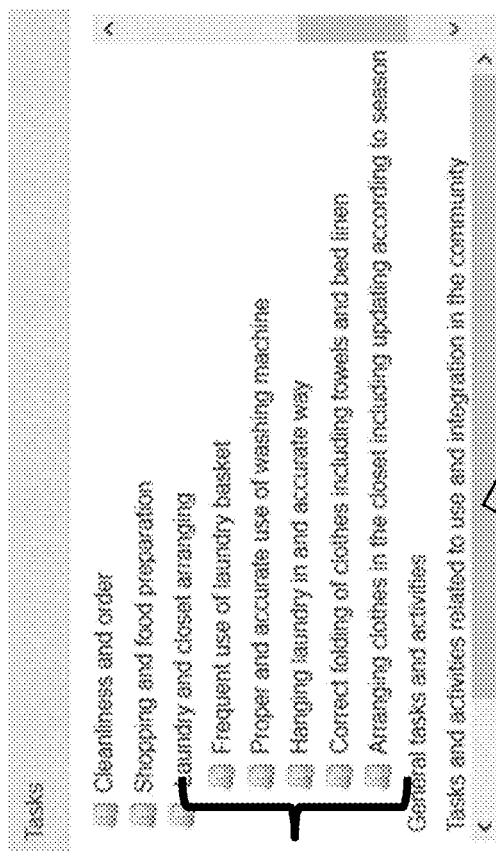

Fig. 25
Work Plan Assessment

Leading factor Assessment

Main Themes Assessment

Questionnaire Periodic Assessment

REHABILITATION CASE MANAGEMENT SOFTWARE

FIELD OF THE INVENTION

The present disclosure relates to medical recording and scheduling.

BACKGROUND OF THE INVENTION

Case management is the coordination of services on behalf of an individual who may be considered a client in different settings such as health care, nursing, rehabilitation, social work, disability, insurance, employment, and law.

Case management may be applied for diverse population, such as children with neuropsychological disorders, individuals with mental health problems, individuals on the spectrum, individuals with intellectual disability, or the elderly.

SUMMARY OF THE INVENTION

The term computing device refers herein to a device that includes a processing unit. Examples for such device are a personal computer, a laptop, a server, a tablet a cellular device and IOT (internet of things) device.

The term user refers to any person who has an authority to use the system. Such a person may be a team member, a client of the case management, a parent etc.

The terms aspect of life refers herein to life category and vise versa.

One exemplary embodiment of the disclosed subject matter is a system and a method for handling case management. According to some embodiments, the system provides a comprehensive solution for rehabilitation programs.

According to some embodiments, the system comprises three main modules:
  personal details module—including key data on the client
  background module—catalog and backup of all relevant documents
  Rehabilitation module—the construction of individual rehabilitation schemes.

Personal Details Module

According to some embodiments, the system enables the team member that is engaged with rehabilitation program to access all information related to the treated client. Such information may include personal details, occupation, education, medications, finance, data related to a rehabilitation program associated with this client and the like. The accessing may be via any computing device and in accordance with access privileges.

Background Module

According to some embodiments, the background module manages the documents required for the rehabilitation process. Some of the documents are produced and titled as part of the work on the individual's rehabilitation scheme and may be transmitted via email to a pre-defined mailing address. Such documents may be my story, aims and objectives. The module includes the options to scan and upload documents, to title according to aspects of life, to characterize the documents (hospitalization summary, occupation diagnostic etc.) and to store and retrieve the documents.

According to some embodiments, the background module provides generic information associated with the treatment. Such generic information may include files. The information may be accessed by linking to relevant databases and is displayed to the user according to relevancy;

Rehabilitation Module

According to some embodiments, the rehabilitation module comprises three main modules:

A module for managing the client's personal vision: this section allows the client to enter data related to his past ("my story"), where he wants to go ("personal vision"), to clarify the central themes in his life and to priorities the life categories for promotion.

According to some embodiments, the system provides the user (client or team member) leading statements and questions, which assist in building the "story". The user may or may not utilize the leading statements or questions (refer herein also as titles). Additionally, or alternatively, the user may write free text.

According to some embodiments, the system leads the user to focus on a specific aspect of life in his life A module for managing the promotion of the client's aspects of life: This module handles the development of work plans to promote the client's selected aspects of life. The module provides the option for mapping needs, identifying aspirations, practical formulation of long-term aims and the objectives derived from them. The module provides the selection and implementation of tasks (by assimilating them in the calendar), for the realization of the objectives. Examples of such managed aspects are career, esthetics, relationship, health, household maintenance, fulfillment etc. The client may first focus on one or two aspects and may then, additionally or alternatively work on other aspects.

A module for periodic assessments: allowing the carrying out of a comprehensive, measurable, periodic assessment According to some embodiments, the system enables the team member to share data associated with the client's rehabilitation scheme and to interact via the system.

According to some embodiments, the system directs the team member and suggests actions and treatments related to the rehabilitation scheme.

According to some embodiments, the system enables the client to be part of the rehabilitation scheme by identifying his personal vision and life categories that he wishes to promote.

Such a system helps to simplify the case management work with an emphasis on forming a standardized means of communication between the team member, the client, his family and/or community.

Such a system enables the collaboration of all the people who are involved in the case. The community may include rehabilitation services (protected housing and hostels, occupation, leisure and education), medical services, welfare services, family, volunteers and more. The system generates a unified and professional language among policymakers and the academia in terms of concepts, which is needed for meeting the client's needs and visions.

Moreover, due to the complexity of the field, the system simplifies the treatment by "spoon feeding" the knowledge and tools required and therefore allowing the team member the ability to concentrate and engage with the client while formulating his "professional identity" in this field.

According to some embodiments, the client is a leading partner in building his rehabilitation scheme and may receive a summary report during and at the end of the process. The system may also provide the client access privileges to enter his personal data for viewing and editing.

According to some embodiments, the GUI of the system provides links to relevant information in many of the windows.

According to some embodiments, the system documents may be categorized and tagged for an easy future search.

Such a system increases the proficiencies and the abilities of the team member and reduces the need for training due to a built-in protocol that provides knowledge and built-in processes, such as generic information, the guidance in building the case management scheme and the reminder tools for performing activities and graphical presentation of periodic measures.

The system is accessible from any computing device such as computer, tablet, mobile device, notebook, etc. thus allowing all the processes (organizational and private sessions with the client), to be performed via the system.

The system collects anonymous data based on organization approval.

The collected data is transferred into big data repository, for AI implementations. Furthermore, the system implements elements of artificial intelligence that assist in a variety of aspects to strengthen rehabilitation processes at the individual level, the team, the organization and the regulator.

In contrast to the psychological treatment in which it will take a generation for the development of artificial intelligence that will be effective, software as a built-in protocol enables the dismantling of various processes. Here are some examples:
  a) Personal assistant for reminders and alerts
  b) Analysis of data and graphs that may help in future recommendations. Written and spoken instructions up to a level of basic conversation for the purpose of updating details, questionnaires, goals and objectives and developing a work plan.
  c) Follow-up and periodic evaluations with attention to important parts that were missed at various stages.
  d) Advanced search and finding of various options of required services and locations in order to promote the success of the rehabilitation scheme.

This system may suit diverse organizations and facilities, in terms of language and regulatory requirements in different countries.

According to some embodiments, the data that is collected by the system may be used for research.

The system enables policymakers to implement principles and preferred professional values.

Such a system provides a comprehensive protocol by combining and integrating professional views from several different prophecies (Social work psychology, psychiatry, occupational therapy and more), and different approaches such as, 'My Story' which is based on the Narrative therapy; 'My Vision' which is based on couching processes. Premier Tasks are based on the Decision Making model, General Tasks are based on the learning process model and the Periodic Assessment is evident based.

The system changes the case managements operation and creates new modality for rehabilitation case management.

This system generates a professional language that represents an advanced concept that is influential on the understanding of key elements in the rehabilitation world, such as hope, choice, healing and faith in the uniqueness, strength and rights, of each individual to live respectably in the community and hold a life of meaning.

Such a system enables a comprehensive multidimensional evaluation and measurement of valuable research, both quantitative and qualitative. The data and graphs enhances the understanding and the improvement of the case management work in an individual/facility/organizational level and in the level of national and international policy-making.

The software allows to study, focus and improve the deep processes and interventions that promote recovery and rehabilitation Such a system may be used by the client itself and provides full cooperation between the client and the rehabilitation worker; thus, making the client a full partner for viewing and updating the required parts with him. This is as opposed to the medical model that is characterized by having the client sit across from the attending physician while information displayed on the screen is not accessible for him.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding, like numerals or characters indicate corresponding, or like components. Unless indicated otherwise, the drawings provide exemplary embodiments or aspects of the disclosure and do not limit the scope of the disclosure. In the drawings:

Figure 10:
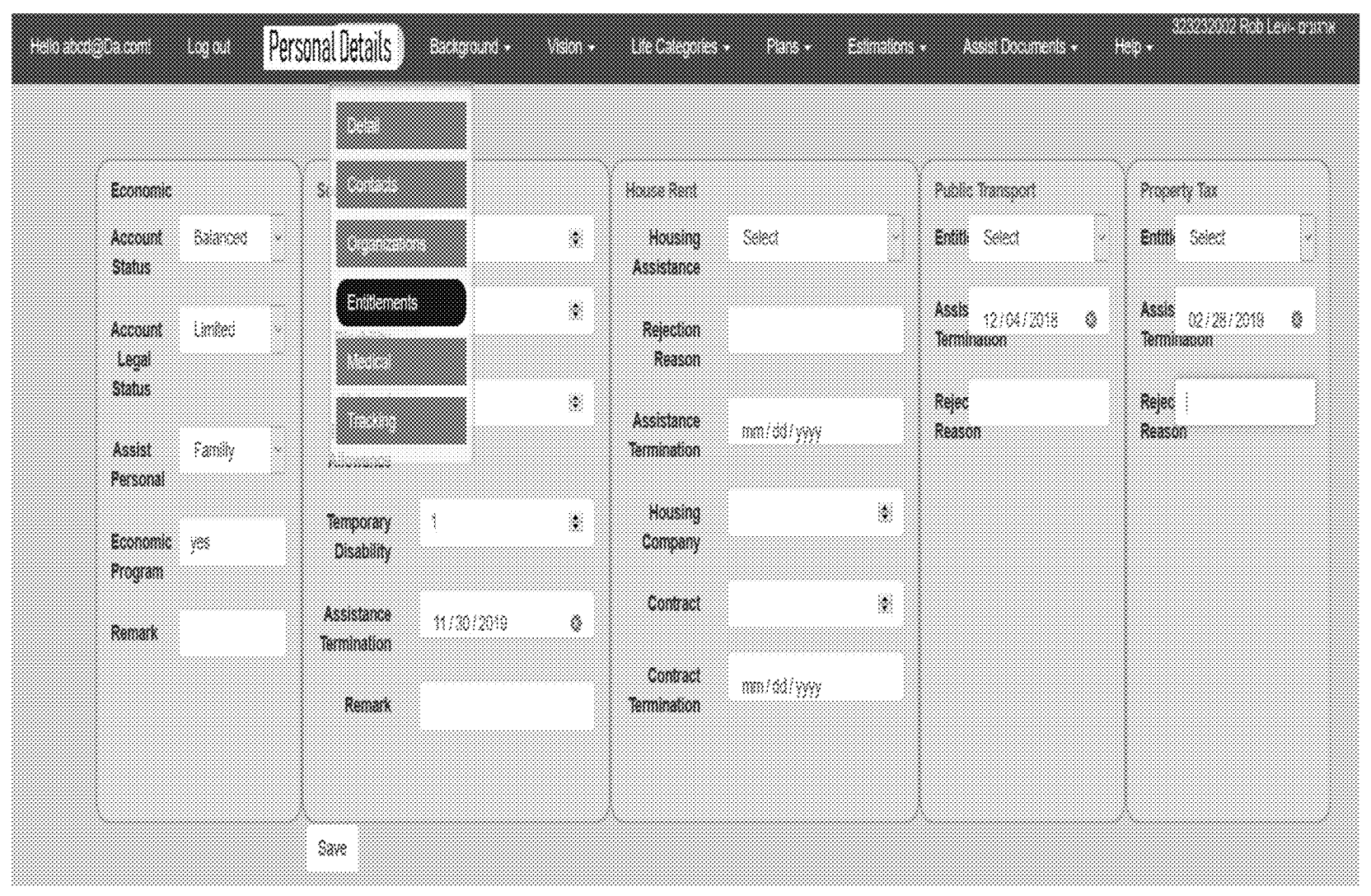

FIG. 10 depicts an exemplary screen shot for updating entitlement details of the client, in accordance with some embodiments of the disclosed subject matter;

FIG. 11 depicts an exemplary screen shot for viewing background documents of the rehabilitation frame of the client, in accordance with some embodiments of the disclosed subject matter;

FIG. 12 depicts an exemplary screen shot for editing a story of a client, in accordance with some embodiments of the disclosed subject matter;

FIG. 15 depicts an exemplary screen shot for selecting life categories of a client, in accordance with some embodiments of the disclosed subject matter;

FIG. 17 depicts a screenshot for editing a story associated with a certain life category selected by the client and another screenshot for editing vision associated with a certain life category selected by the client, in accordance with some embodiments of the disclosed subject matter;

FIG. 21 depicts a screenshot for deploying a general task according to the learning process model, in accordance with some embodiments of the disclosed subject matter;

FIG. 25 depicts various embodiments for general periodic assessment of the client, in accordance with some embodiments of the disclosed subject matter;

DETAILED DESCRIPTION

Figure 1:
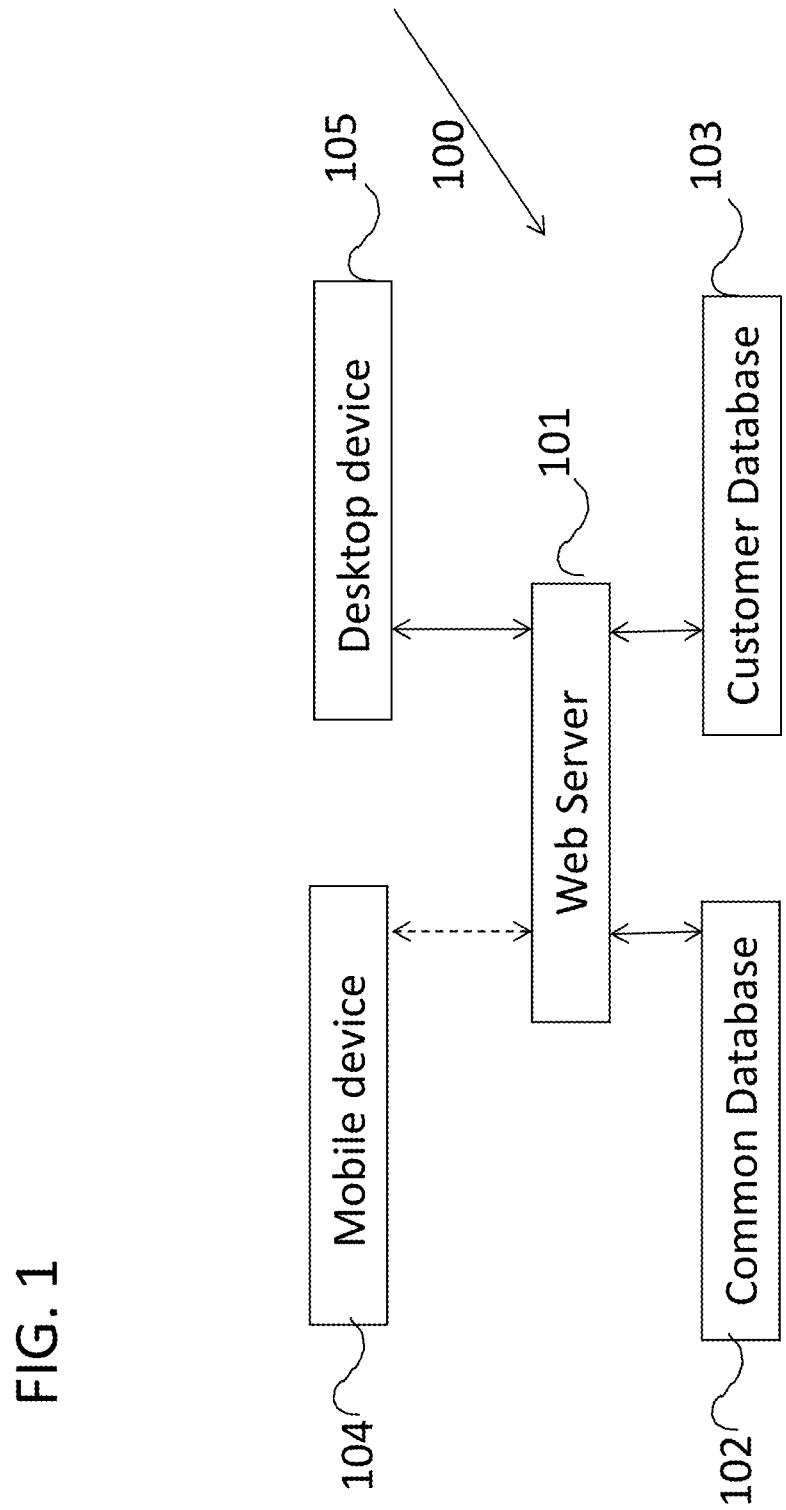
FIG. 1 shows a block diagram of the system for handling case management, in accordance with some exemplary embodiments of the subject matter.

FIG. 1 shows a block diagram of the system for handling case management, in accordance with some exemplary embodiments of the subject matter. System 100 includes a web server 101, a common data base 102 and a customer database 103.

The web server 101 is configured for handling the GUI for the system for handling case management. The Web server 101 is configured to communicate with one or more mobile devices 104 and with one or more desktop computing devices 105 for enabling users to access the system for handling case management from anywhere and in accordance with their privileges. The user may be a client or a team member or a family member of the client.

The web server 101 communicates with a plurality of customer databases 103 for presenting and for storing data entered by the users of an organization associated with a certain database from the plurality of data bases 103.

The web server 101 communicates with the common data base 102 for presenting the titles, combo box, drop down, questionnaires, links to articles etc.

Each item in the common data base 102 is associated with one or more case management types. Such case management type includes for example, mental health problems, elderly people, people on the spectrum, intellectual disabilities and the like.

Each client's database 103 includes data that is entered by the users of the system of a certain organization. Such data is available to the users in this organization accordance with their privileges. Such customer database 103 may communicate with the computing devices connected network of the organization and with the web server 101.

Figure 2:
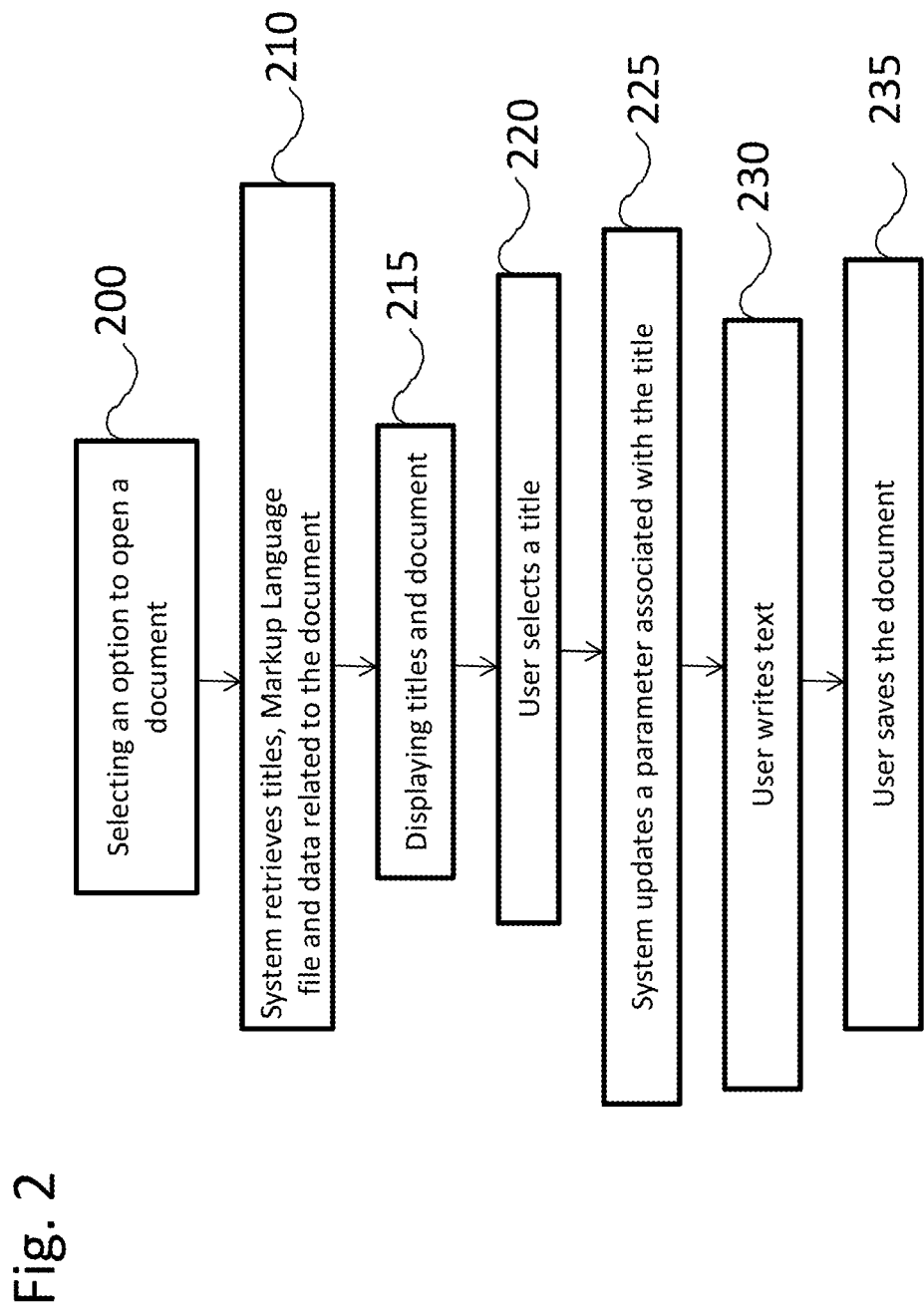
FIG. 2 shows a block diagram of a method for generating a document from guidelines in accordance with some embodiments of the disclosed subject matter.

FIG. 2 shows a block diagram of a method for generating a document from guidelines in accordance with some embodiments of the disclosed subject matter;

According to some embodiments, the system presents to the user guidelines on one side of the window and an open document on the other side. Such guidelines assist the user in generating the document. Such guideline may be related for example to a document about the background or the vision of the user. Examples of such documents are 'my story' and 'my vision'.

At block 200 the user selects an option to open a document, for example, a document that is configured to include the client's background.

At block 210 the system retrieves, from the common data base, titles for guiding the user to write the client's background. The system also retrieves a markup language file for presenting the titles and the document to the user. Examples of such Markup Language files are an XML or an HTML file. The system also retrieves from the customer data base associated with the user the data related to the document; that is to say if the user saved the document, the text, titles or any other data that was entered by the user can be retrieved from the data repository.

Figure 16:
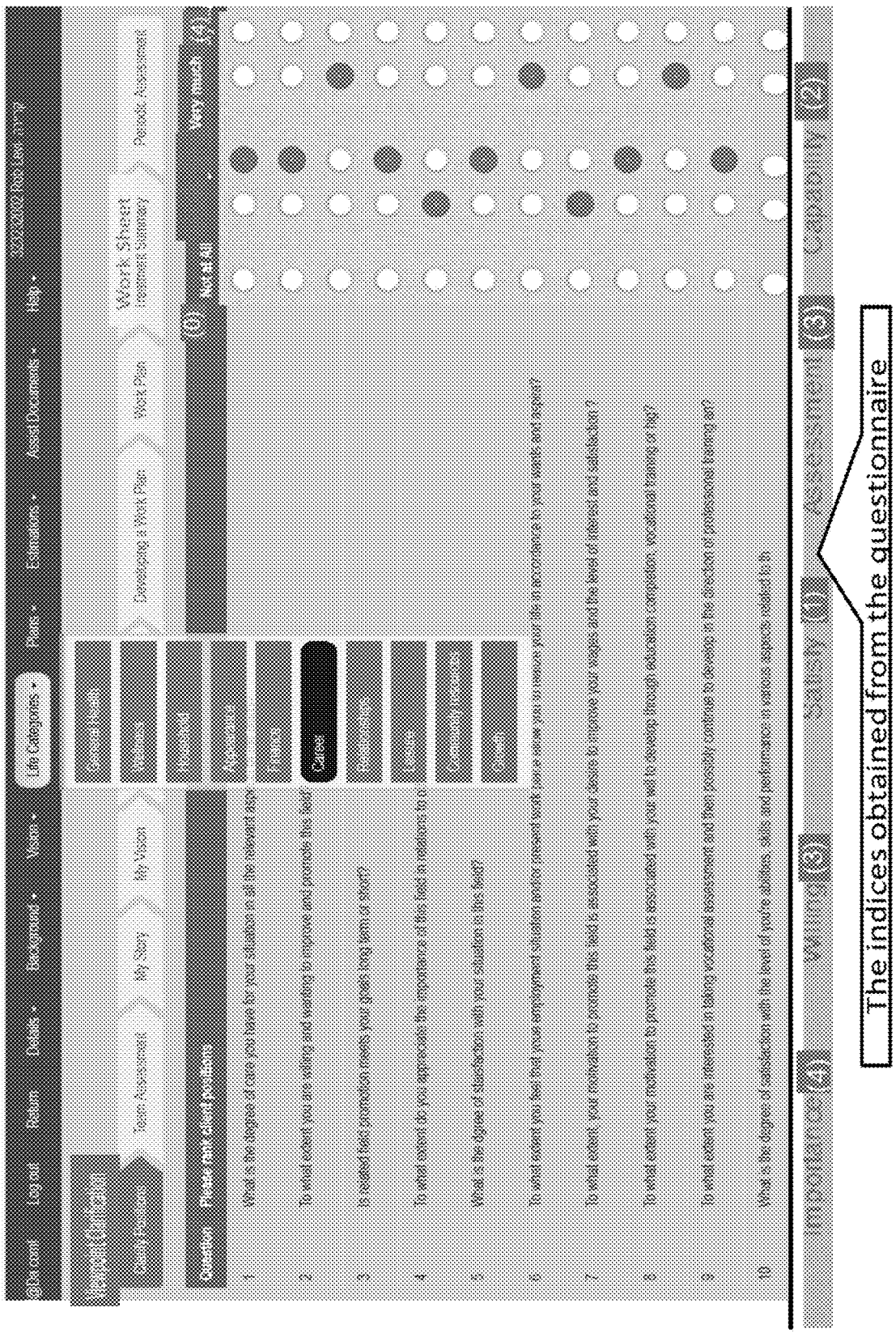
FIG. 16 depicts an exemplary screenshot of a questionnaire to a user associated with life category of a client, in accordance with some embodiments of the disclosed subject matter.

At block 215 the system displays the titles in one side of the window and the document on the other side of the window. If the user selects an existing document, the text and titles that have already been entered are displayed to the client on the window. An example of such a window is shown in FIG. 16.

At block 220 the user selects a title. The selection may be for example by double clicking on the title or by dragging the title to the document.

At block 225 the system receives the event of selecting a title. The event includes the location of the title and the identification of the title. As a result, the system updates the parameter that is associated in the XML or HTML file with the title. The title is presented to the user on the display.

At block 230 the user writes text. As a result, the system receives the event of writing. The event includes the text and the location of the text. The system updates the parameter that is associated in the XML or HTML file with the text. The text is presented to the user on the display.

At block 235 the user saves the document. As a result, the parameters that were updated during the session are saved in the client database.

Figure 3:
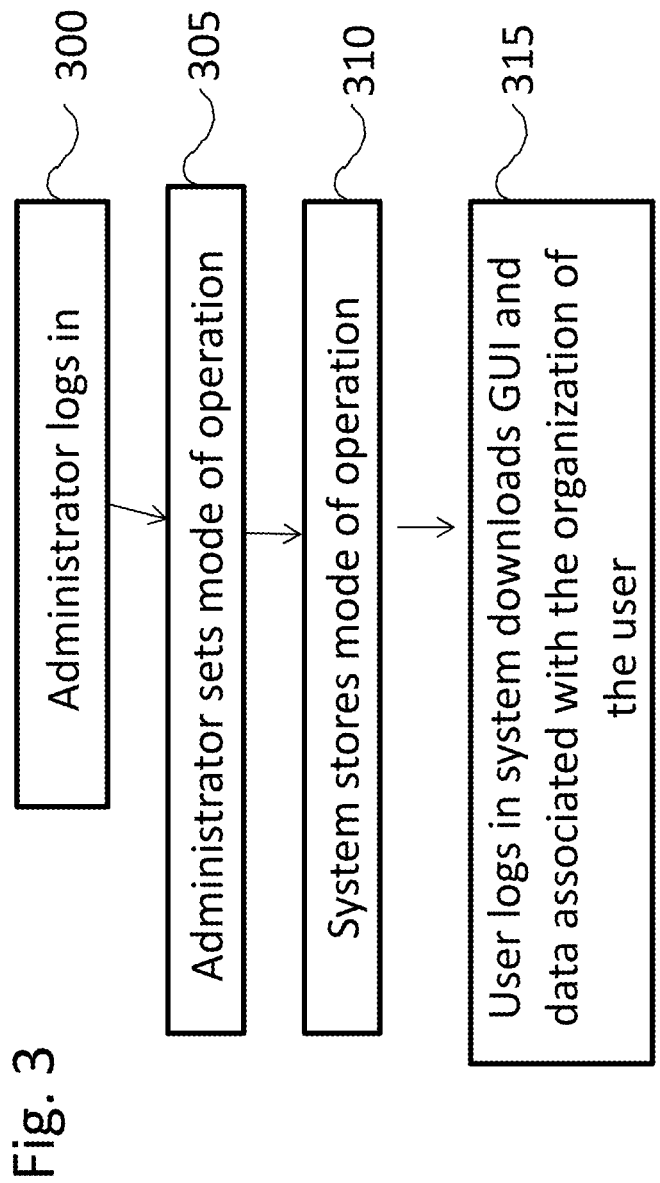
FIG. 3 shows a block diagram of a method for selecting mode of for handling case management, in accordance with some exemplary embodiments of the disclosed subject matter.

FIG. 3 shows a block diagram of a method for selecting mode for handling case management, in accordance with some exemplary embodiments of the disclosed subject matter. According to some embodiments, the system is configured to adapt the GUI according to type of population; that is to say, the GUI that is presented for mental health services is different from the GUI that is presented to a service working with intellectual disabilities.

Referring now to the drawing:

Blocks 300, 305 and 310 show the process of setting the mode of operation for a certain service.

At block 300 the administrator logs into the system. In one example, an administrator of an organization dealing with people with mental health problems or illness enters the system.

At block 305 the administrator sets the mode of operation. In one example the administrator sets the mode of operation to "mental health".

At block 310 the system stores the mode of operation for this service as mental health.

Blocks 315, show the process of displaying the GUI in accordance with the mode of operation.

Figure 4:
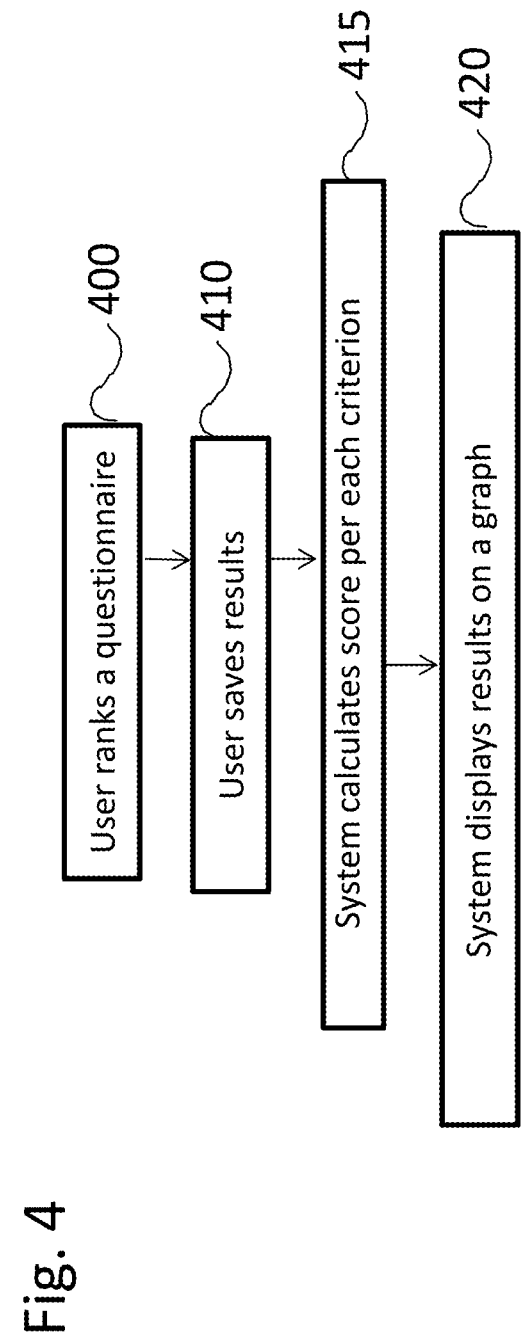
FIG. 4 shows a block diagram of a method for assessing a progress in the rehabilitation program, in accordance with some exemplary embodiments of the disclosed subject matter.

At block 315 the user logs into the system. Since a user has already been registers to a certain organization the system identifies the type of the organization the user belongs to and retrieves the data related to that organization such as Mental Health FIG. 4 shows a block diagram of a method for questionnaire assessment, in accordance with some exemplary embodiments of the disclosed subject matter.

According to some embodiments, the system provides an option for assessing a client's progress from the point of view of the team member and from the point of view of the client and for presenting the assessed progress on a graph. Such assessments can be related to criteria such as meeting aims, level of satisfaction and the like.

According to some embodiment, the questionnaires cover all aspects life. According to some embodiments, some of the questions are common to all questionnaires. An example of general question is the importance of general satisfaction and the like.

Referring now the drawing:

At block 400 the user ranks the questionnaire that is presentment to him.

At block 410 the user saves the results.

At block 415 the system calculates score per each criterion according to the ranking of the user. Examples of such criteria are willingness, ability, skill, independence and results. According to some embodiments each question is associated with a certain weight for each criterion. Per each criterion the system multiplies the rank of each answer with the weight associated to the question and sums all the results.

At block 420 the system displays the results on a graph.

The above assessment is part of life category work process

Figure 5:
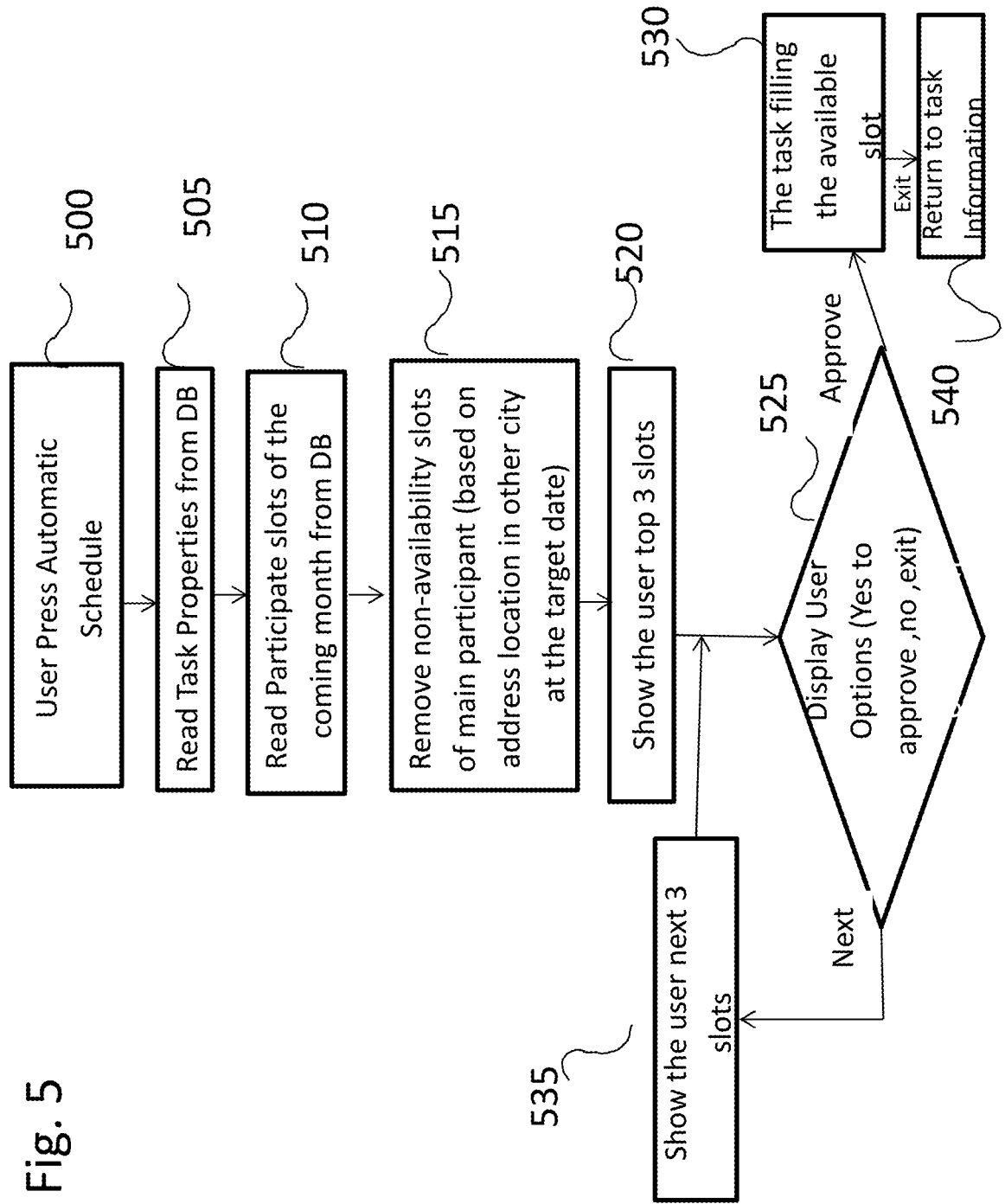
FIG. 5 shows a block diagram of automatic scheduling of a meeting, in accordance with some exemplary embodiments of the disclosed subject matter.

FIG. 5 shows a block diagram of a method for automatic scheduling of a meeting, in accordance with some exemplary embodiments of the disclosed subject matter.

According to some embodiments the system automates the meeting schedule taking into consideration available time of all participants.

At block 500 the user selects a task and requests automatic scheduling for the task.

At block 505 the system reads the properties of the task from the customer data base. Such properties may be time, location, participants in the task, etc.

At block 510 the system fetches from the data repository available time slots for each participant.

At block 515 the system identifies non available slots according to location of the meeting location of the participant, non available slots etc.

At block 520 the system calculates best slots and presents to the user, as shown above.

At block 525 the user is requested to accept or reject the slots.

At block 530 which occurs if the user approves the slot, the slot is reserved and the information is saved at block 540.

At block 535 which occurs if the user does not approve the slot the next slot is presented for selection and operation resumes to block 525 for allowing the user to select the next slot. The operation continues until all the slots are presented.

Figure 6:
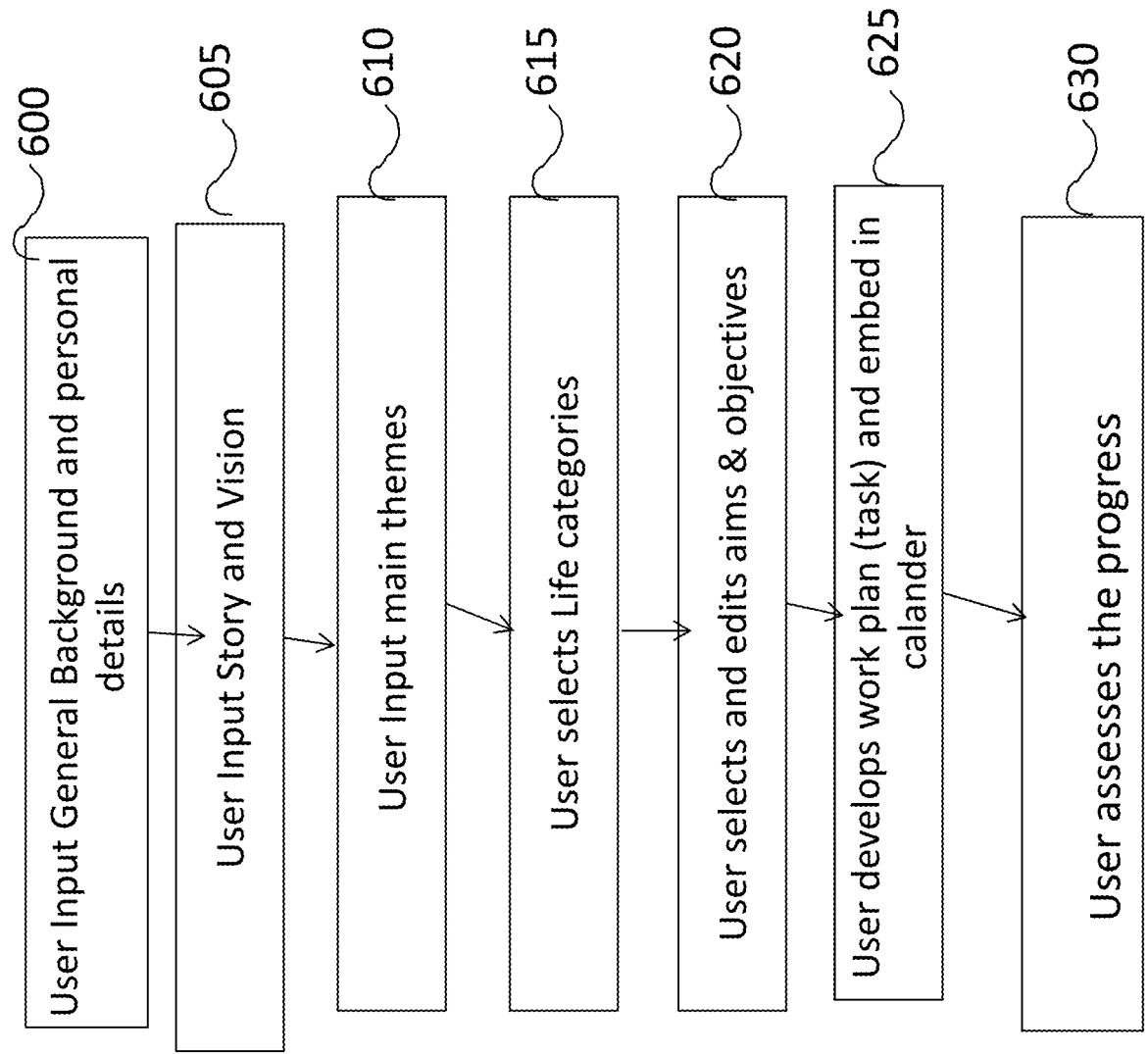
FIG. 6 shows a block diagram a protocol for handling case management, in accordance with some embodiments of the disclosed subject matter.

FIG. 6 shows a block diagram a protocol for handling case management, in accordance with some embodiments of the disclosed subject matter.

At block 600 the user inputs background and personal details. The details of the personal (team member or family or community members) are entered. The details of the organization that is responsible for the case management is entered. The detail of the employee is entered such details may include personal details, details of contact people, entitlements (such as social security), medicines taken by the client or any other medical information, doctors and doctors' appointments, employment background of the client, schedule meeting with team member and meeting summaries, documents related to the client that are uploaded to the system (such documents may be related, for example to other organization in which the client was treated, to medical or data etc). The system also associates the client with the team member and organizations that are part of the case management.

At block 605 the user inputs the story and the vision of the client. The story and vision may be inputted by the client himself or by the team member. The story is explained in greater details in FIG. 12. The vision is explained in greater details in FIG. 13. The method of inputting a story or vision is explained in greater details in FIG. 2.

At block 610 the user inputs main themes. The main themes may be inputted by the client himself or by the team member. The main themes are explained in greater details in FIG. 14. The method of inputting the main themes is explained in greater details in FIG. 2.

At block 615 the user selects life categories. The main life categories are explained in greater details in FIG. 15.

At block 620 the user selects and edits 'aims & objectives' associated with life categories. The aims and objectives are explained in greater details in FIG. 17.

At block 625 the user inputs the work plan. The system embeds the work plan in the colander. The work plan is explained in greater details in FIG. 19.

At block 630 the user assesses the progress of the client. The assessment is performed by answering questionnaires on the selected life category. The assessment is performed by answering questionnaires on the progress in task. The assessment may be performed at the beginning and at the end of the work plan or even throughout the work-plan for monitoring progress. The system presents to the user graphs related to the assessment in which the user can see the progress or the difference between the assessments of the team versus the assessment of the client.

Figure 7:
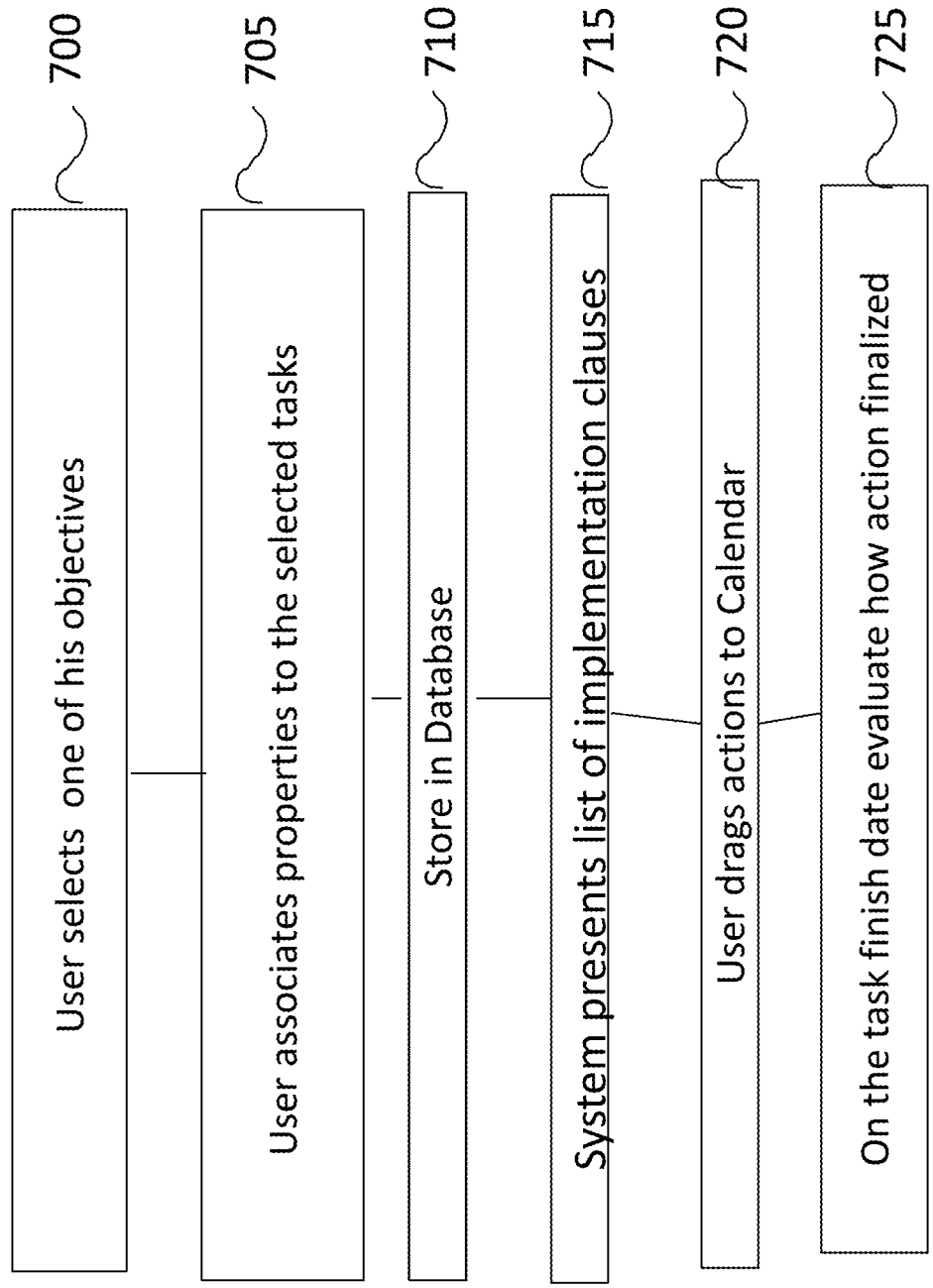
FIG. 7 shows a block diagram a method for handling the work plan, in accordance with some embodiments of the disclosed subject matter.

FIG. 7 shows a block diagram a method for handling the work plan, in accordance with some embodiments of the disclosed subject matter.

At block 700 the user selects one of his objectives, and associate to relevant task. An example of such an objective is "Participation in IMR Workshop". An example of such task is "Participation in workshops and groups, such as IMR and more". The system has the ability to highlight relevant tasks for chosen objectives. The user may also define tasks.

At block 705 the user associates properties to the selected tasks. Such properties may be location, deadline, importance, scheduled meeting and measures for measuring the performance of the tasks. Such measurements may include willingness, ability, skills, independence and results. The user also associates the personal to each task.

At block 710 the system stores the results in a data base.

At block 715 the list of implementation clauses that are derived from the task are presented to the user. Such implementation clauses may be for example "Participation in workshops and groups, such as IMR and more", Coordinator, Community and integration, Partial Level of support, Accessibility and Orientation, Skill—Low, meeting details.

At block 720 the user drags the implementation clause to the calendar. The system may also synchronize the tasks in the calendar of all the personal that are assigned to the tasks. The synchronization takes into account other activities of the personal and of the client. The synchronization takes into account the location of performing the tasks.

At block 725 which occurs at the end of the task user evaluates the progress of the wok plan by responding to a questionnaire.

Figure 8:
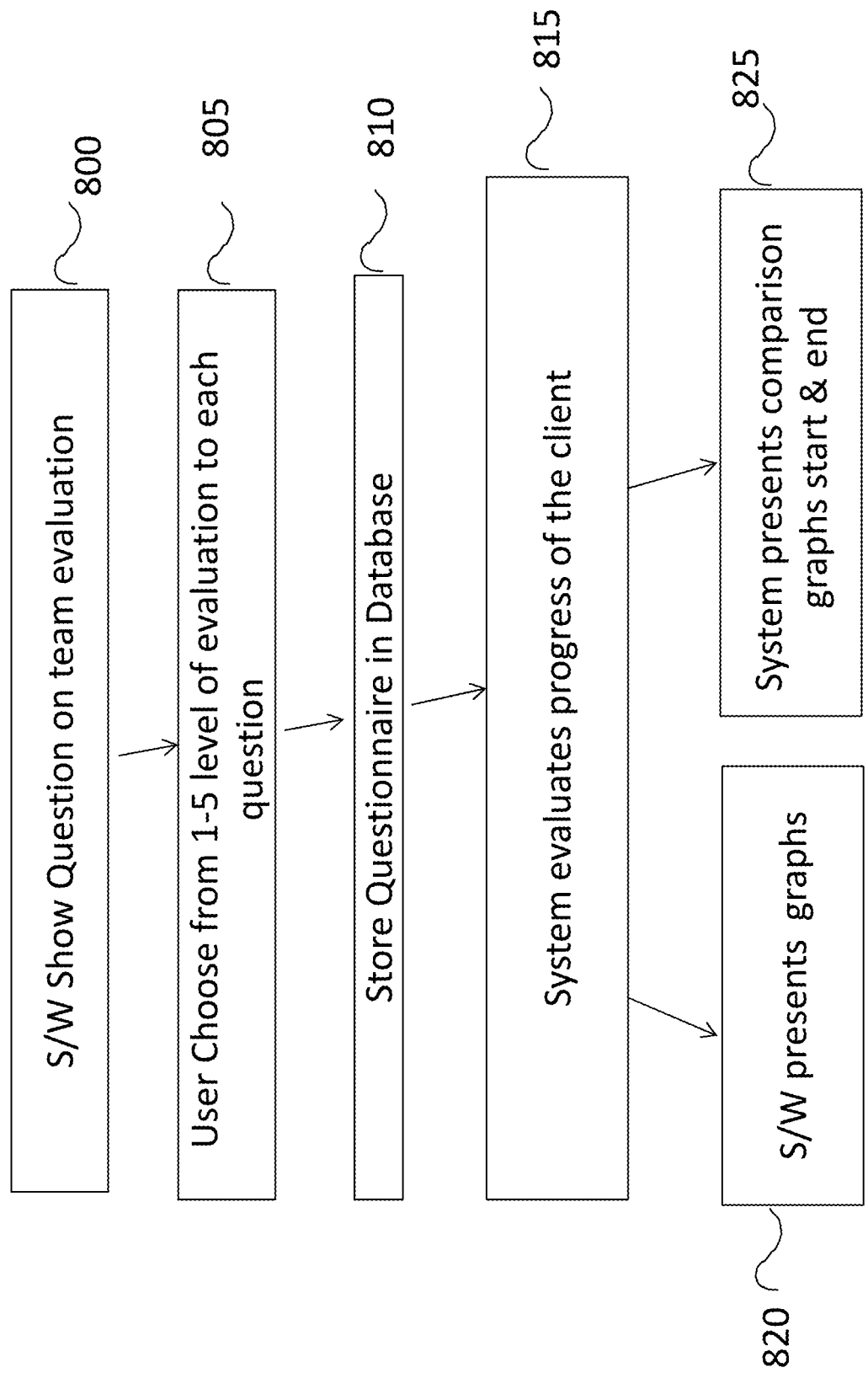
FIG. 8 shows a flowchart diagram of a method for processing a questionnaire, in accordance with some embodiments of the disclosed subject matter.

FIG. 8 shows a flowchart diagram of a method for processing a questionnaire, in accordance with some embodiments of the disclosed subject matter.

According to some embodiments a questionnaire is provided for assessing the progress of the work plan. The questionnaire may be performed at the beginning or the end or during the work plan. The questionnaire may be performed by a team member or by the user.

At block 800 the system presents a questionnaire to the user.

At block 805 the user selects for each question a level from five optional levels.

At block 810 the system stores the responses in a data base.

At block 815 the system evaluates the progress of the client according to measures. Such measures may include Importance, Willing, Satisfaction, assessment, Capability.

At block 820 the system presents a graph according to the results of the evaluation that is performed in block 815.

At block 825 the system presents a graph that compares current evaluation with previous evaluation. Another graph may compare the evaluation of the team member with the evaluation of the client.

Figure 9:
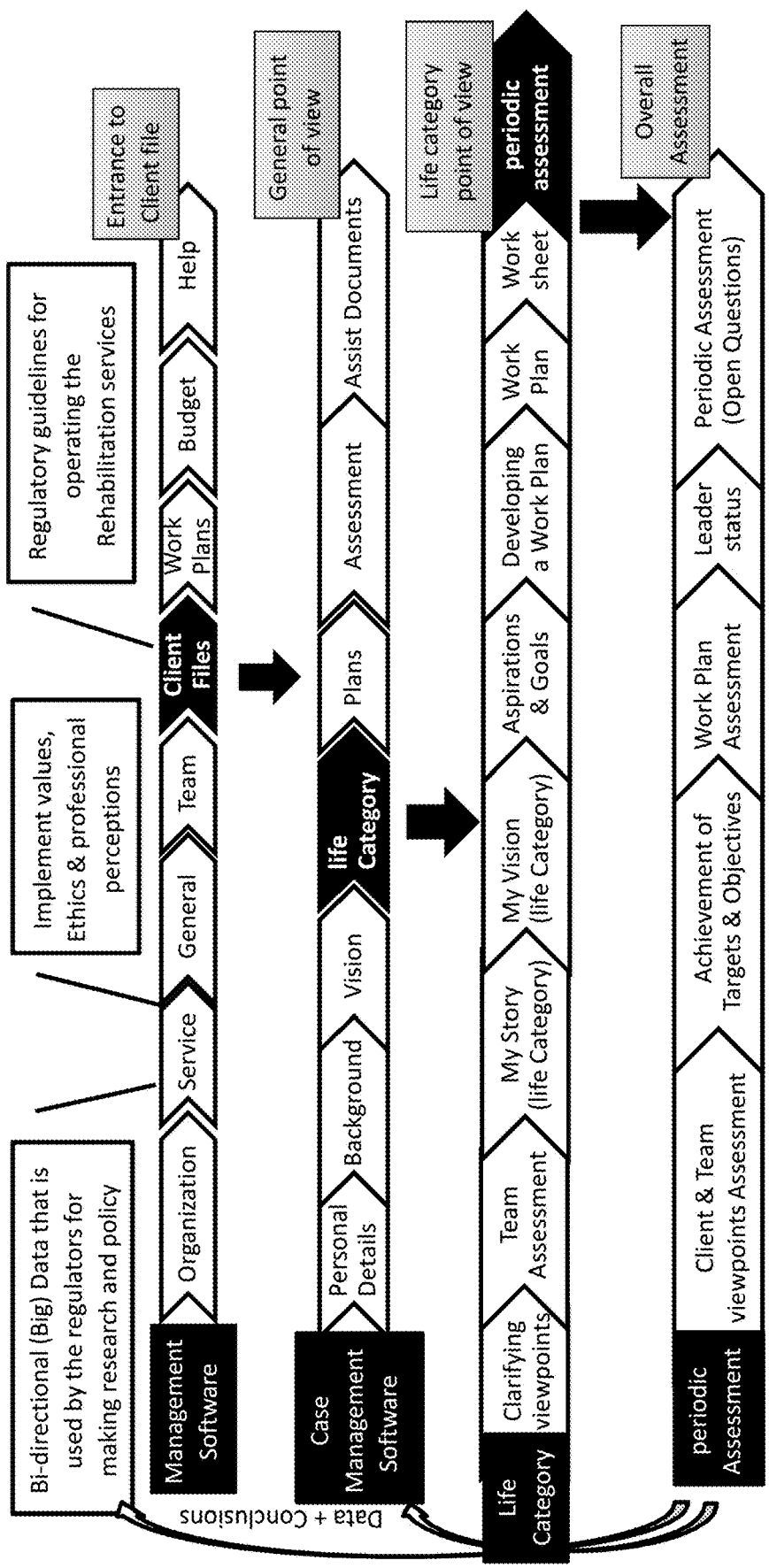
FIG. 9 depicts General Layout of Unit's management program and case management program, in accordance with some embodiments of the disclosed subject matter.

FIG. 9 depicts a general layout of the service management program and case management program, in accordance with some embodiments of the disclosed subject matter;

FIG. 10 depicts an exemplary screen shot for updating entitlement details of the client, in accordance with some embodiments of the disclosed subject matter;

FIG. 11 depicts an exemplary screen shot for viewing the client's background documents, in accordance with some embodiments of the disclosed subject matter;

FIG. 12 depicts an exemplary screen shot for editing the client's "Story", in accordance with some embodiments of the disclosed subject matter.

The system provides a convenient platform for viewing "My Story", which begins in a chronological view of the rehabilitation scheme and invites the client (with the help of the team member), to tell his life story and all the important and significant events of his choosing. The story is based on the narrative approach, according to which the person in the telling is the main character. Through the narrative story, the client can better understand life-altering events, feelings, thoughts and behavior of himself and others. The story also assists in identifying forces and choices that reflect the strengths alongside the detection of cracks in the story that point out problems and helplessness.

The exemplary screenshot depicts a number of titles that are presented as statements and questions that may guide and focus the work. According to some embodiments, the titles appear in a rational order, within the title "Personal background and course of life" and the emphasis is on the chronological order of one's life's story. Such titles also appear within the title of "Expandable questions and references" and there the focus is on profound questions on important aspects such as family, financial status, studies and more. The titles enable the user to focus the life's story on one area. Questions within the main title of "work process" are designed to ensure the client feels satisfied and comfortable with the questions and the work process and finds the method of writing his life's story significant and contributing. The user may select any title and position it in the editing area.

Figure 13:
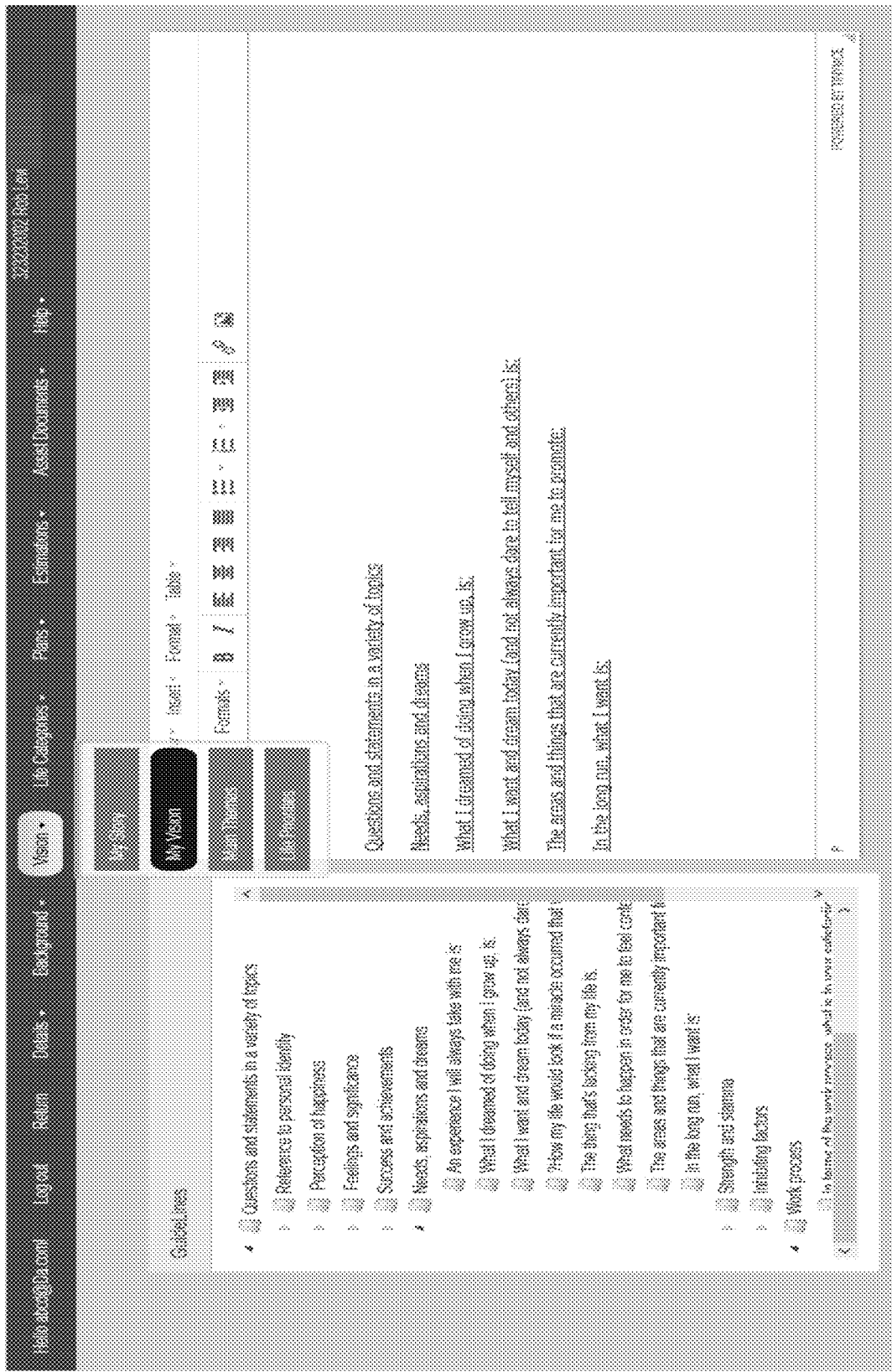
FIG. 13 depicts an exemplary screen shot for editing a vision of a client, in accordance with some embodiments of the disclosed subject matter.

FIG. 13 depicts an exemplary screen shot for editing a client's vision, in accordance with some embodiments of the disclosed subject matter. The purpose of the vision tab is to serve as a convenient platform where the client, with the help of the team member, is invited to create his hopes and dreams into an image that depicts the best kind of life for him. The "Personal vision", follows "My story", deals with the creation of life future chapters. The system presents a number of titles shown as statements and questions which may guide and focus the editing of the vision document. Such titles may provide an in-depth view into personal identity, aspirations and dreams, perception of happiness, achievements and successes, etc.

Figure 14:
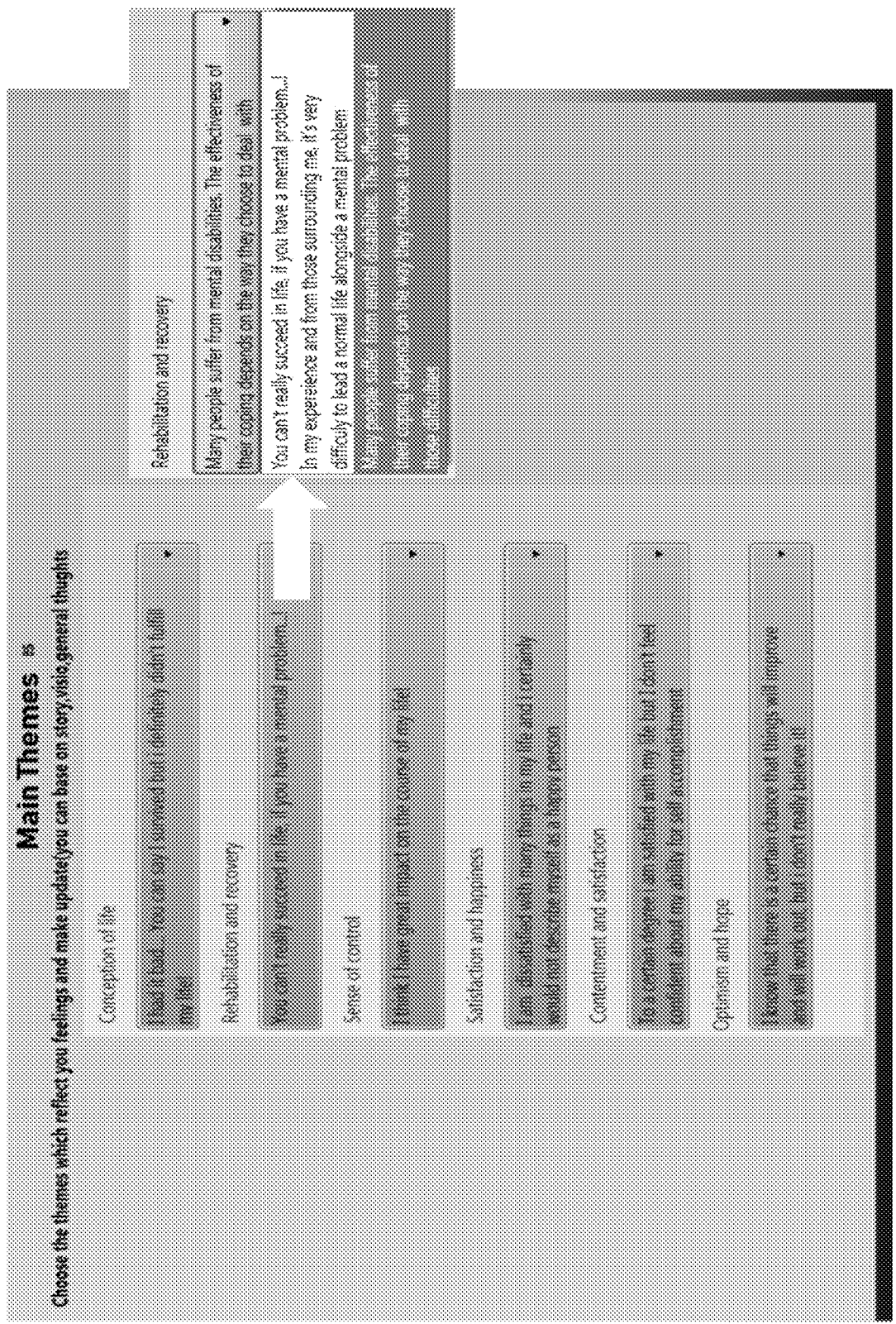
FIG. 14 depicts an exemplary screen shot for inserting main themes of a client, in accordance with some embodiments of the disclosed subject matter.

FIG. 14 depicts an exemplary screen shot for inserting the client's main themes, in accordance with some embodiments of the disclosed subject matter.

The option for inserting themes is a summary of the previous two parts "My Story" and "Personal Vision". However, it can be used independently since its updating is not dependent on the two previous parts. This section allows the client, through the presented themes, to express, in a concise manner, his inner world and his perceptions of himself and the world around him, with an emphasis on relevant aspects of recovery and rehabilitation.

The screenshot depicts six predetermined main themes that may play a major role in the client's rehabilitation story. The client is invited to select the theme that best depicts his thoughts and feelings. The six main themes are: Life's perception, rehabilitation and recovery, sense of control, satisfaction and happiness, contentment and fulfillment and optimism and hope. For each theme, the user is given three choices (not shown in the figure), each expressing a position regarding the client's ability to lead and influence his life using a scale of none, partly and mostly. When performing periodic assessment after several months or longer, the system shows whether there is a change in the selected statements in the themes, which could be an indicator that signifies whether the client has a higher sense of ability to lead and influence his life.

FIG. 15 depicts an exemplary screen shot for selecting the client's life categories priorities, in accordance with some embodiments of the disclosed subject matter. According to some embodiments, the user may select life categories on which he/she wishes to focus in the rehabilitation process. Examples for life categories are: well-being, career, household, relationship, personal growth, community resources, general health, leisure, appearance and finance, among others.

The life categories priorities provide an holistic overlook full and complete life.

FIG. 16 depicts an exemplary screenshot of 'Viewpoint Clarification questionnaire' associated with the client's chosen life category, in accordance with some embodiments of the disclosed subject matter. According to some embodiments, the system provides a questionnaire that enables the client and the team member to assess the attitude of the client towards the selected life category and thus to assess its progress in the rehabilitation process.

The purpose of this questionnaire is to deeply understand the in-depth dialogue between the client and the team member regarding the main attitudes that guide the client in various life categories. Furthermore, the questionnaire can be viewed as a motivational interview that could bring a positive effect on the client's willingness to engage in the chosen life category and work for its promotion.

The questionnaire may include 15 questions. In some embodiments 11 out of the 15 questions are generic to all life categories and four questions are specific to each of the category. These questions eventually create five indices: 1) Importance; 2) Willingness; 3) Satisfaction 4) Assessment; 5) Capability The questions assist in deepening the understanding and the defining of the field in question, in an objective and subjective manner Objectively, the client receives an image showing him what the area features along with his subjective attitude towards the specific area. It should be noted that the main significance of this questionnaire is not the results, but the process and the discourse raised by the questionnaire. This is the first step in promoting the selected life category. At the end of the questionnaire, the system presents a graph that depicts clearly the main attitudes with respect to the specific life category.

It should be noted that the questionnaire for the client is similar to the questionnaire for the team member.

Figure 17:
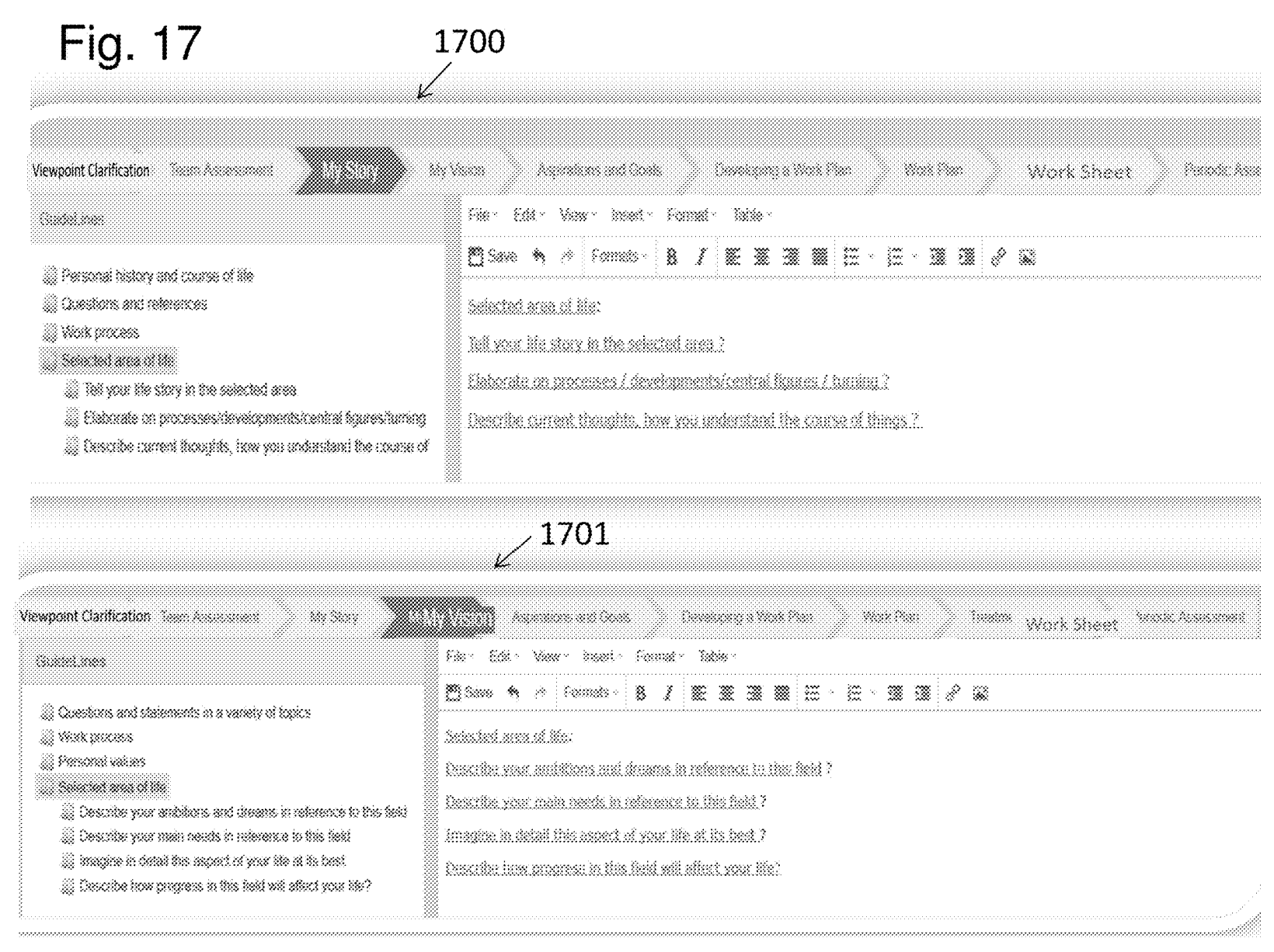

FIG. 17 depicts a screenshot for editing the story associated with a certain life category selected by the client, and another screenshot for editing vision associated with a certain life category selected by the client, in accordance with some embodiments of the disclosed subject matter. Screen 1700 is for editing a story that is associated with a s certain life category selected by the client. Screen 1701 is for editing a vision that is associated with a certain life category selected by the client.

Figure 18:
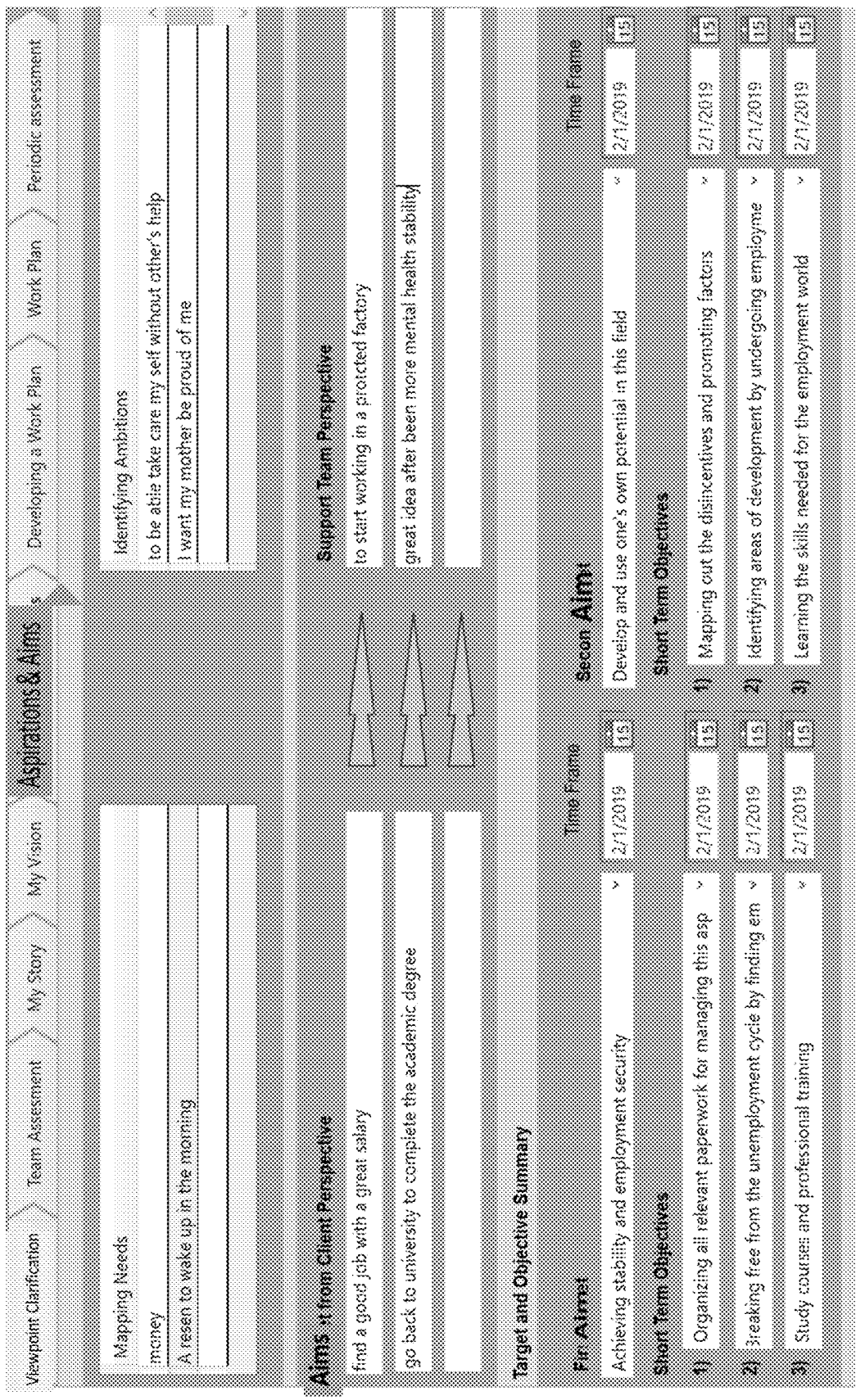
FIG. 18 depicts a screenshot for promoting aspiration and aims in accordance with some embodiments of the disclosed subject matter.

FIG. 18 depicts a screenshot for aspiration and aims in accordance with some embodiments of the disclosed subject matter. The purpose of this tab is to allow firstly, the description of the individual's needs and ambitions about promoting the chosen aspect of life and secondly (which is a derivative and a continuation of the first part), to invite the client to draft the initial aims in his own words while the team members are welcomed to assist if needed. The last stage requires the client, with the team member's help, to make a final draft of the aims and objectives including a time frame (or select from the options offered). The first phase is the mapping of needs and identification of aspirations, when the emphasis is placed on the fact the client is the sole specialist in terms of himself and his life. The team member's role at this stage is to accompany and support the process and to assist with the retrieving and organizing of the contents. The assumption is that the more the client feels that he "owns" his needs, desires and aspirations, his motivation to promote the area will increase. More so, there is a further objective that is derived from this line of work—constructing the relationship between the client and the team member. Updating this section helps the team member consolidate its role and allows the client to optimally settle in the relationship as one who leads his life and his rehabilitation process. The second part includes writing aims in a raw form in the client's own words, without outside interference such as professional language and templates. Here there is also an invitation to promote a fertile dialogue between the client and the team member, which also allows the team member to express their opinion, to advice and direct, without harming the client's independent choices.

The purpose of this part is to choose and formulate two main aims and to tailor objectives which can help fulfill the aims. A distinction is made between aims which are long-term (months/years), and objectives which are short-term (weeks/months).

The system provides an option to choose a time frame to accomplish the aim and objective, aims. The client and team member are invited to explore the possibilities offered, but also have the option to edit and formulate independently, so that the aims and objectives fit the client's needs perfectly. It is recommended, in the spirit of Maslow's Pyramid of needs, to focus the first aim on basic needs and the second on a desire for more.

The user may select an objective from a list or he may edit the aim or objective by himself. The default for the time frame for a aim or an objective, the default is in accordance with the rehabilitation scheme time frame.

Figure 19:
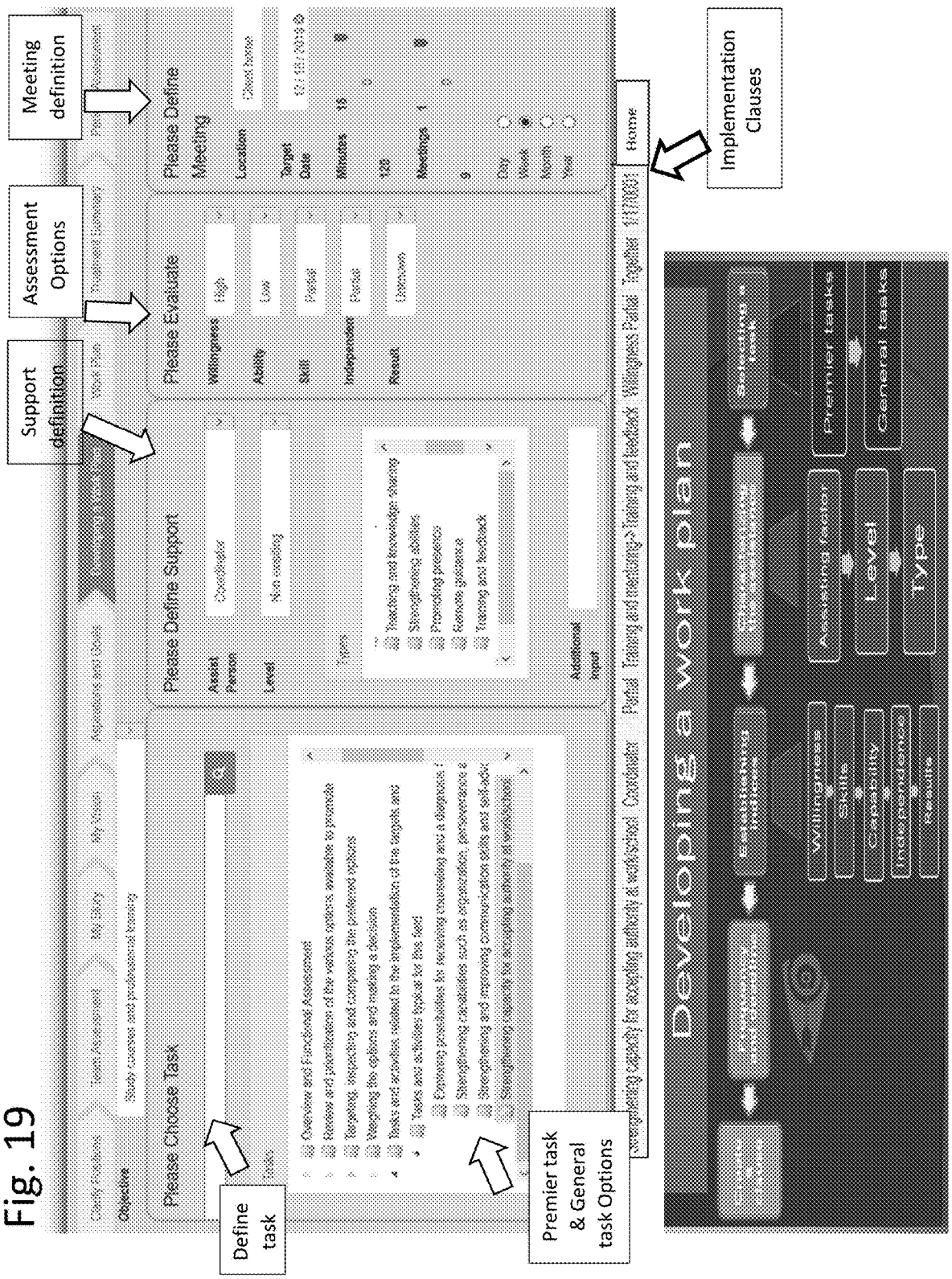
FIG. 19 depicts a screenshot for developing a work plan, in accordance with some embodiments of the disclosed subject matter.

FIG. 19 depicts a screenshot for developing a work plan, in accordance with some embodiments of the disclosed subject matter. The work plan is derived from the previously set objectives. The work plan allows the user to derive the relevant tasks and develop them into a detailed and complete implementation clause that can be set in the calendar. According to some embodiments the link between the different screens occurs with the "objective based" box, located at the top of the screen that automatically connects to the objectives previously chosen. The work plan does not have to rely on the previous stage and the reliance is only subjected to the user's choice.

According to some embodiments the work plan includes a task, means of assistance the assisting agent, the level of assistance required, description of the assistance, assessing completion by choosing a suitable evaluation technique and assigning deadlines for completion.

The work plan provides an option to select how the client and the team member will assess the client's performance and completion of set tasks.

According to some embodiments there are types of tasks: a. a non-recurring task (such as buying a laundry basket). Such a task is focuses and deals with attaining concrete things. The tasks due date is the latest date for completion. B. Routine task: a task that occur at regular intervals (such as cleaning, washing, budget keeping, cooking, etc.). Routine tasks engage in regular activities, which are a vital part of the client's stability and community integration.

This section convert objective into actual practical work plan, by creating implementation clause.

Figure 20:
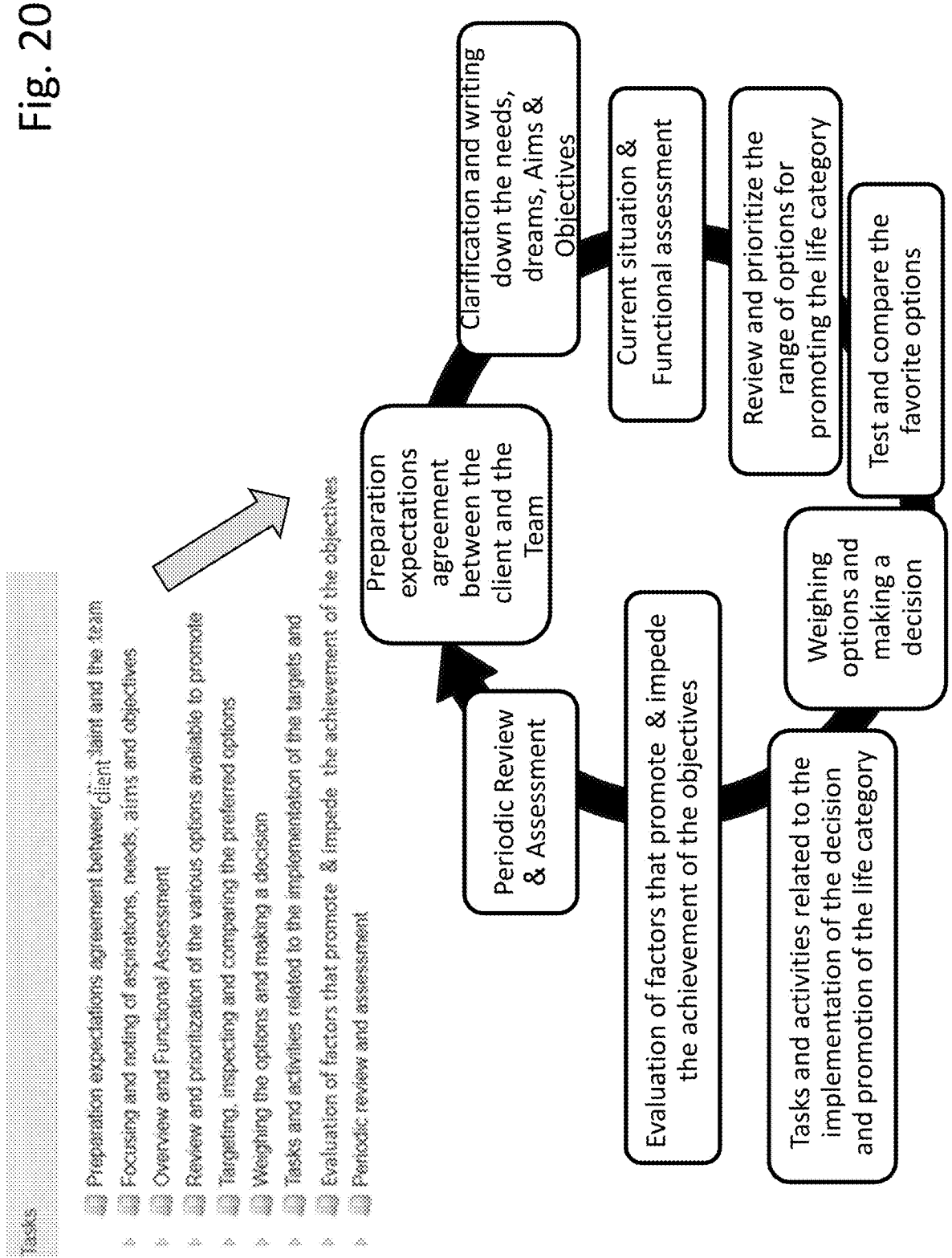
FIG. 20 depicts a screenshot for the process of decision making, in accordance with some embodiments of the disclosed subject matter.

FIG. 20 depicts a screenshot for the process of decision making; in accordance with some embodiments of the disclosed subject matter.

The premier tasks are organized and sorted in accordance with decision making model.

FIG. 21 depicts a screenshot for deploying a general task according to the learning process model (improve the effectiveness of the work plan), in accordance with some embodiments of the disclosed subject matter. The figure shows an example of a sequence of tasks related to doing laundry and arranging a cupboard. The figure shows an example of a sequence of tasks related to doing laundry and arranging a cupboard.

Figure 22:
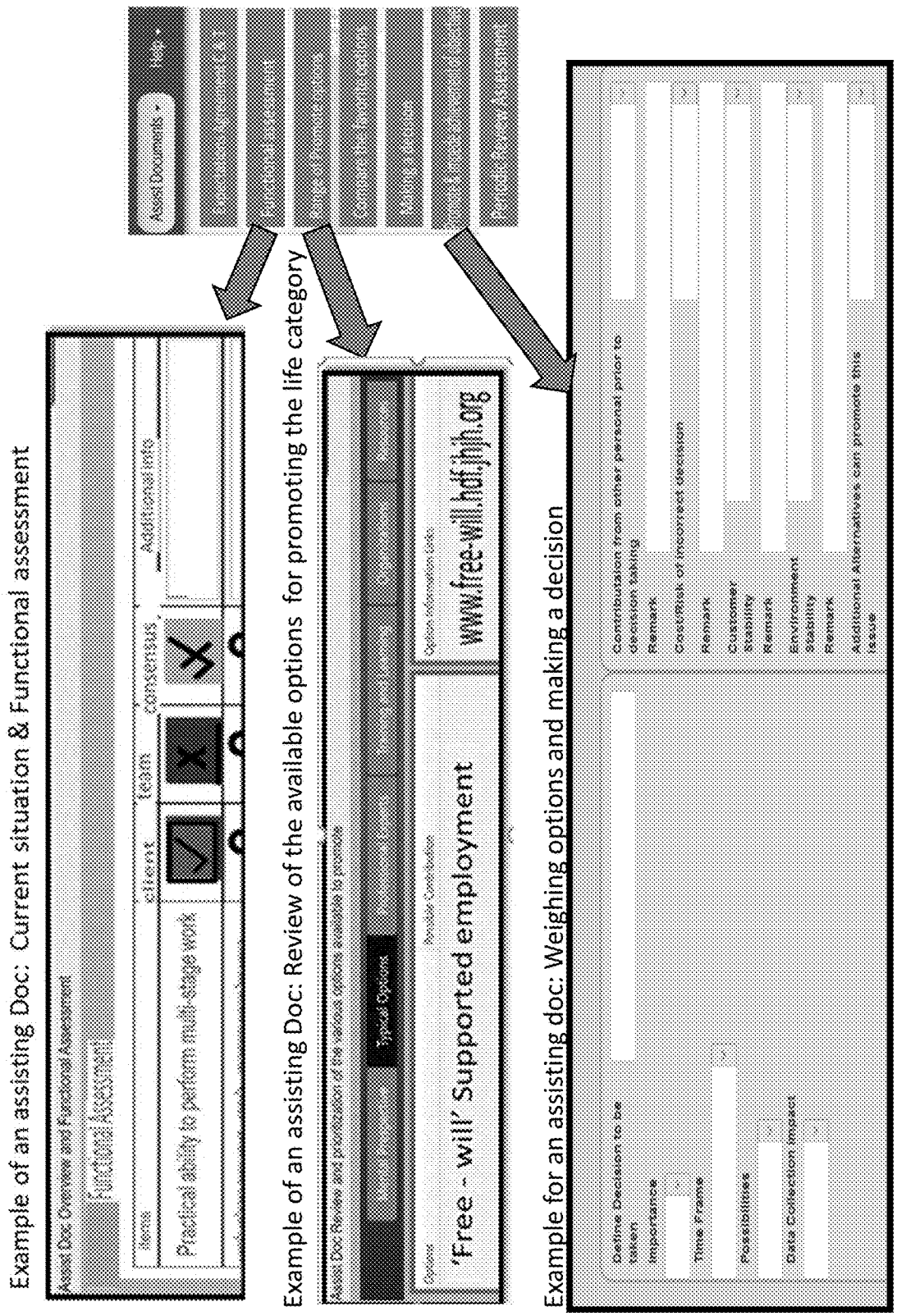
FIG. 22 depicts a screenshot of an example of an assisting Doc: Review of the options available for promoting the life category, in accordance with some embodiments of the disclosed subject matter.

FIG. 22 depicts a screenshot of an example of an assisting doc, in accordance with some embodiments of the disclosed subject matter. The document reviews the options available for promoting the life category from different perspective. The assist documents are fully correlated with each of the premier task. Each premier task is associated with documents for assisting in performing the task.

Figure 23:
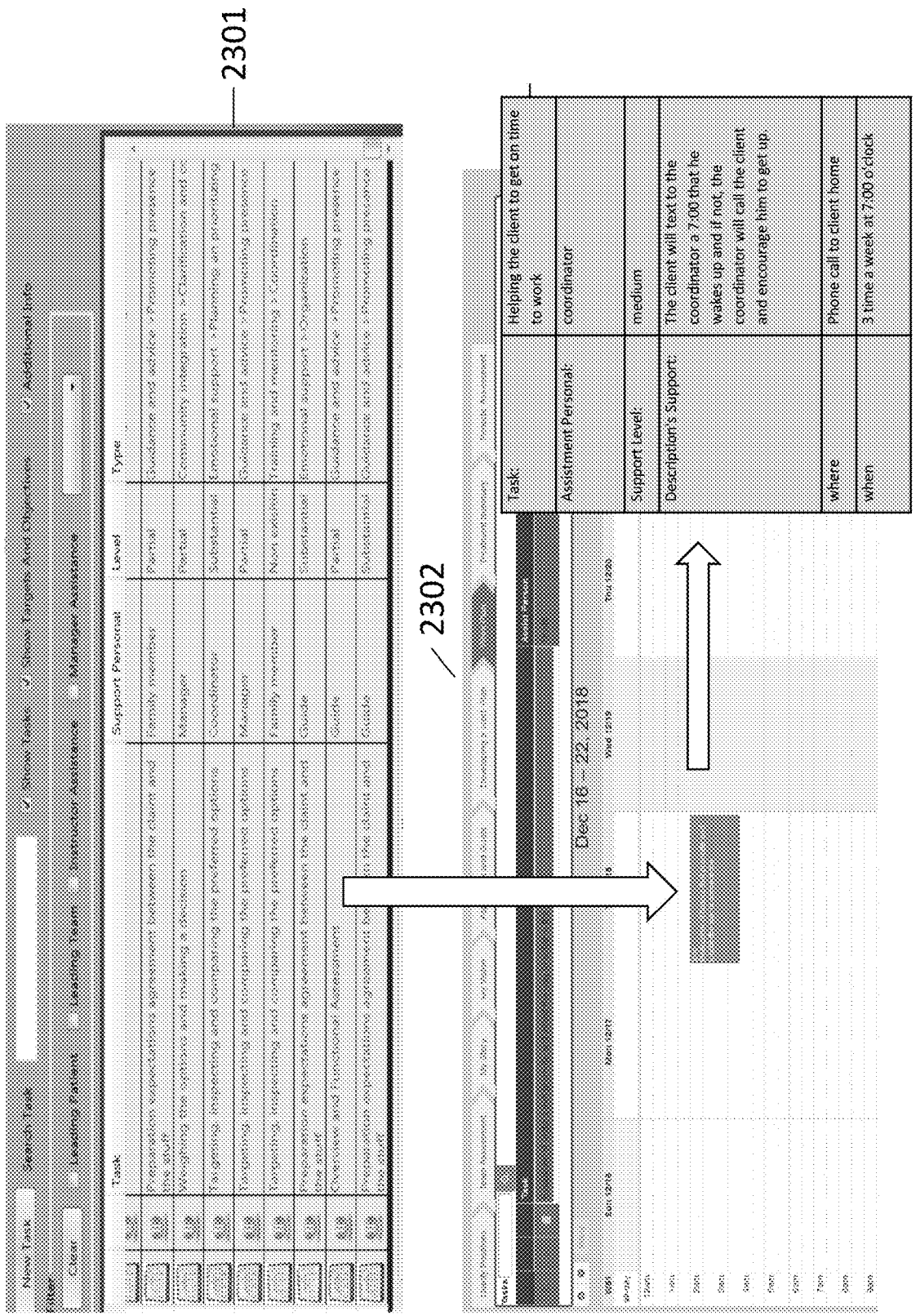
FIG. 23 depicts the process of moving a task to a calendar, in accordance with some embodiments of the disclosed subject matter.

FIG. 23 depicts the process of moving a task to a calendar, in accordance with some embodiments of the disclosed subject matter. A task from the task table 2301 is dragged into the calendar 2302. Table 2303 lists the properties of the task: assignment personal, support level, description of support, location and time. The calendar is synchronized with all relevant participants. The work plan is embedded in the routine work of the client and partners.

Figure 24:
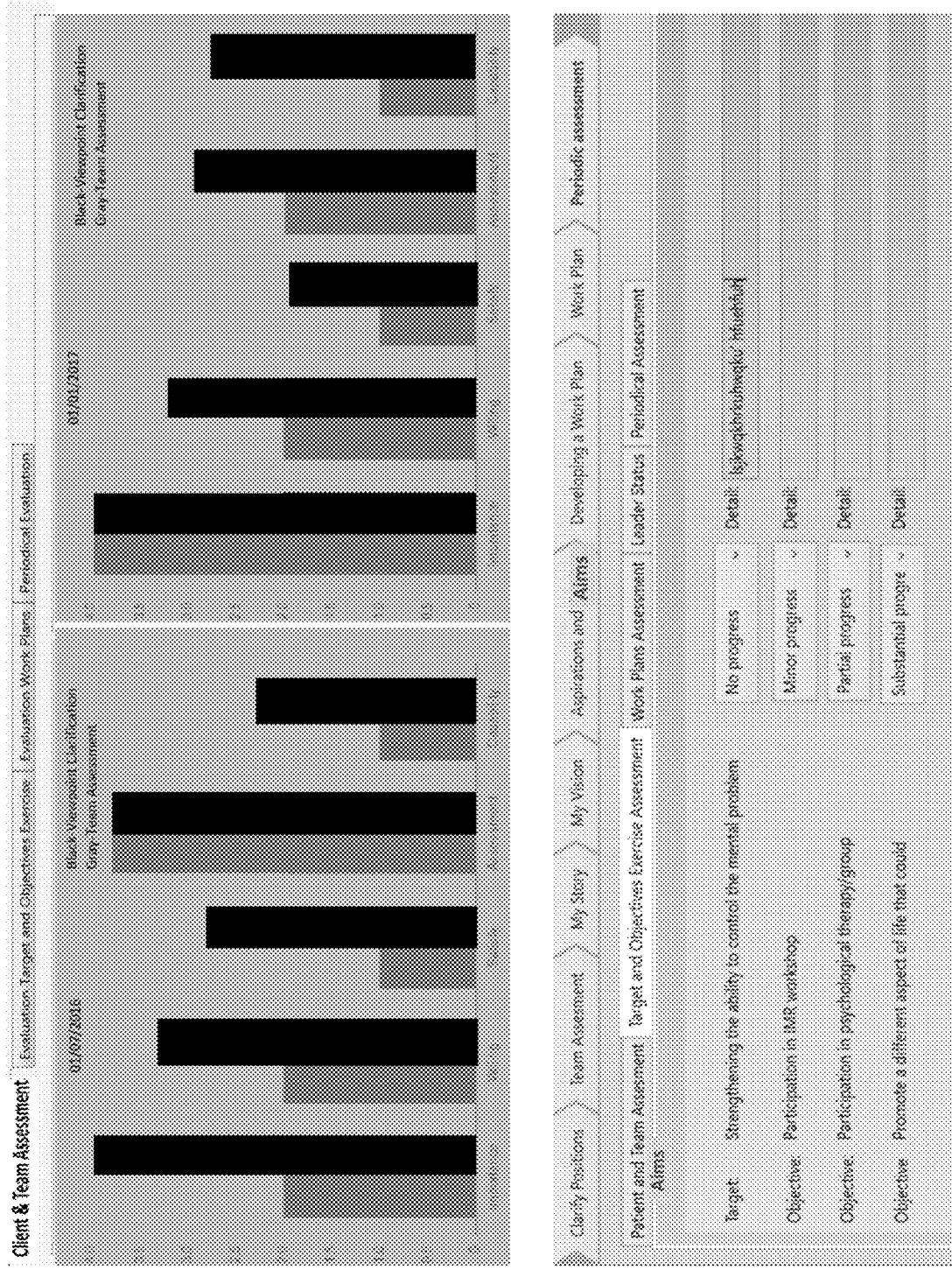
FIG. 24 depicts screenshots of graphs of life category periodic assessment, in accordance with some embodiments of the disclosed subject matter.

FIG. 24 depicts screenshots of graphs of life category periodic assessment, in accordance with some embodiments of the disclosed subject matter. Graph 2401 shows client and team member assessment. Screen 2402 shows the assessment of aims and objectives.

The graph allows a large degree of understanding in terms of the individual and the group. A look in to the points of congruence or disparity, serves both the client (who gets a clear picture of his situation), and the team member (teaching them what to focus on). The graph can be used in a variety of ways, such as: A comparison between different periods in the client's life, a comparison between the different aspects of life the client dealt/deals with, a comparison between the team member's different perspectives in different periods of time or settings, a comparison of a group of clients which allows a vast systematic understanding of the different services with respect to a timeline. The comparison is performed on the following indicators 1) Importance; 2) Willingness; 3) Satisfaction 4) Assessment; 5) Capability The graph is a tool for reflection and is an output of the questionnaire. Since the questionnaire may be performed periodically the graph allows observation over time, providing the client, the team member and the different services an opportunity to deepen the understanding regarding the client's optimal promoters and also provides a significant clues as to where to put the most energy and effort.

Figure 25:
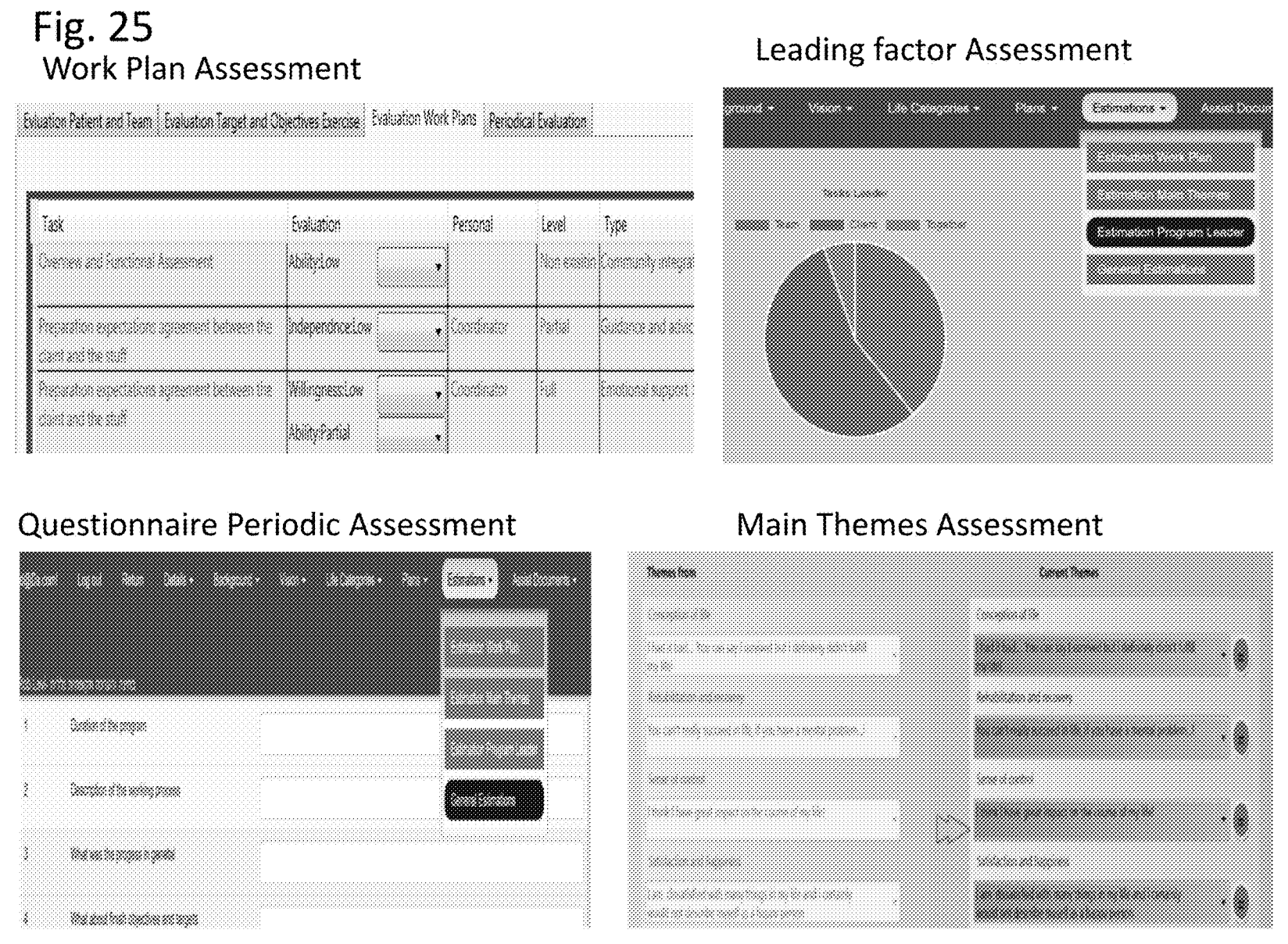

FIG. 25 depicts various embodiments for general periodic assessment of the client, in accordance with some embodiments of the disclosed subject matter. Estimation of Work Plan, Program Leader, Main Themes and General are display to the user.

General periodic assessment is updated from different dimensions and point of views.

Figure 26:
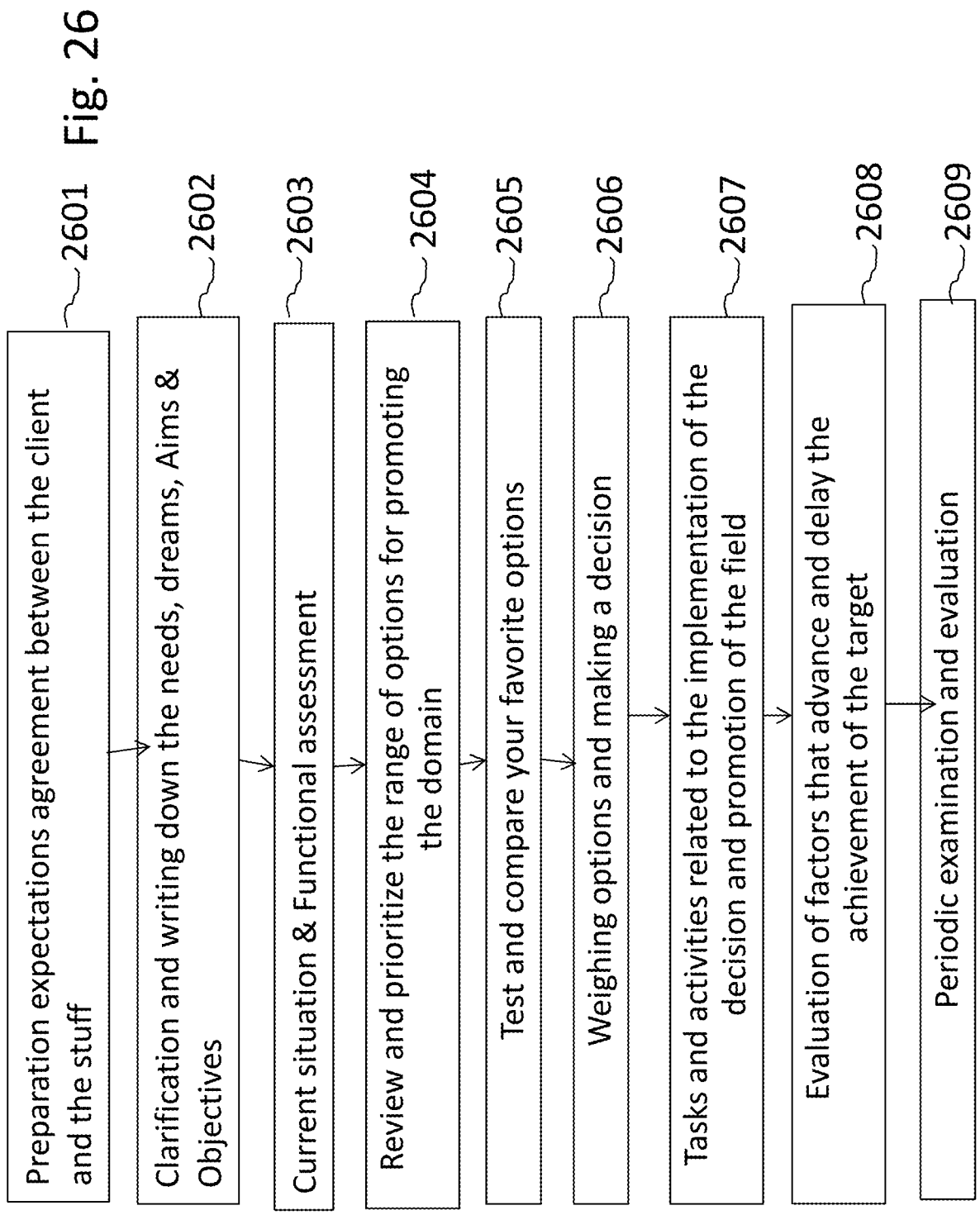
FIG. 26 shows a block chart diagram of a scenario for handling case management, in accordance with some embodiments of the disclosed subject matter.

FIG. 26 shows a block chart diagram of a decision making process, in accordance with some embodiments of the disclosed subject matter.

At block 2601 the system prepares expectations agreement between the client and the team member.

At block 2602 the client and the team member perform viewpoint clarification by writing down the needs, dreams, Aims & Objectives.

At block 2603 the client and the team member perform team member overview & Functional assessment.

At block 2604 the client and the team member review and prioritize the range of options for promoting the domain.

At block 2605 the client and the team member test and compare favorite options.

At block 2607 the client and the team member weigh options and make a decision.

At block 2608 the client and the team member set up tasks and activities related to the implementation of the decision and promotion of the field.

At block 2609 the client and the team member perform periodic assessments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

Figure 27:
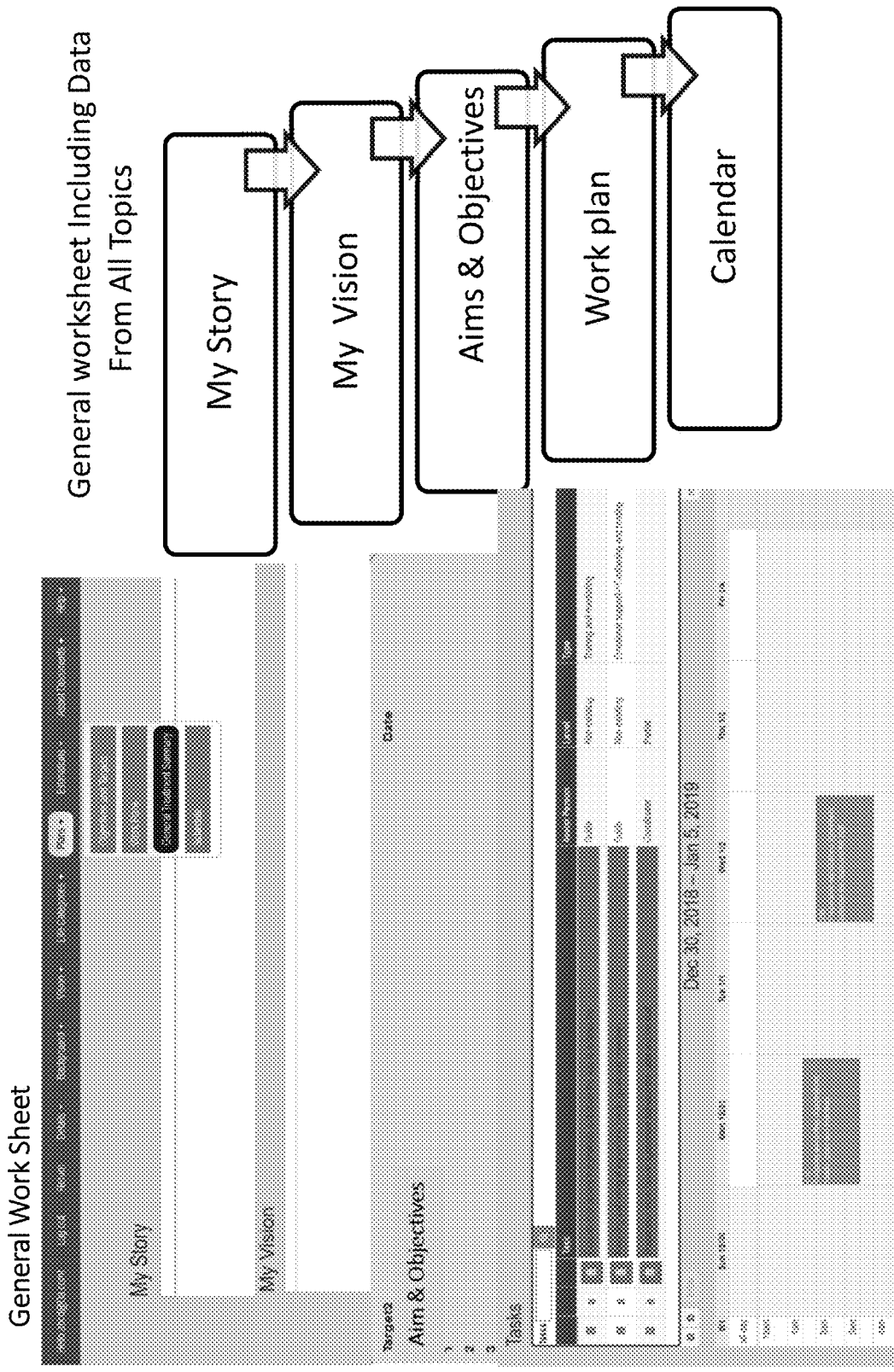
FIG. 27 depicts a screen shot of general work sheet, in accordance with some embodiments of the disclosed subject matter.

FIG. 27 depicts a screen shot of general work sheet of all topics, in accordance with some embodiments of the disclosed subject matter. It should be noted that each like category may be associated with its own worksheet. According to dome embodiments there is an option to get deferent Worksheet for each Life Categories.

Figure 28:
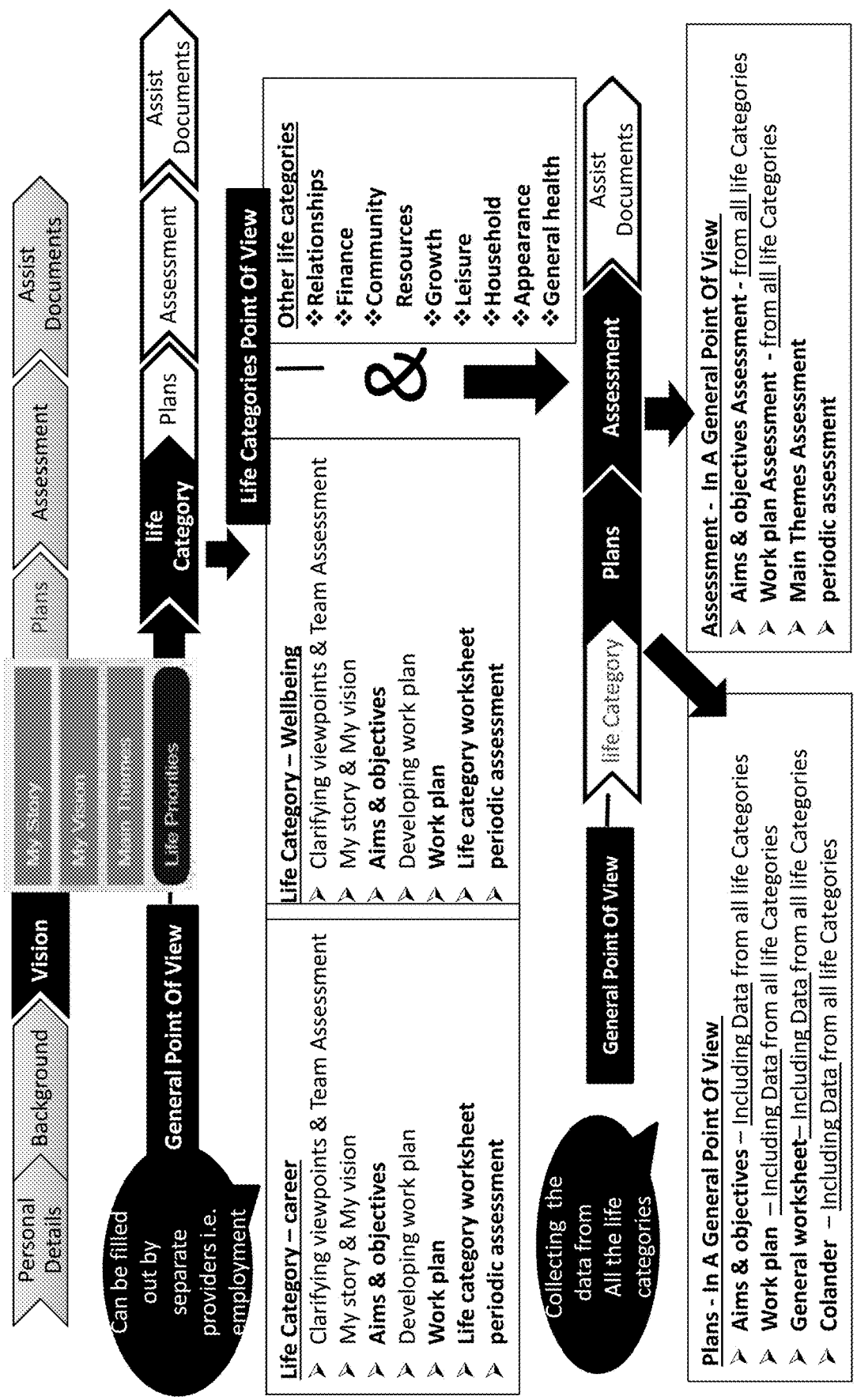
FIG. 28 depicts the transition from general point of view to a specific life category and vise versa, in accordance with some embodiments of the disclosed subject matter.

FIG. 28 depicts the transition from general point of view to a specific life category and vise versa, in accordance with some embodiments of the disclosed subject matter.

According to some embodiments the rehabilitation process provides the transition from generic point of view to focusing on one or more life category in short term and long term and vise versa. The user can work on a selected life category and view all data related to the life category. Such data may include questionnaires, tasks in calendar guidance etc. Additionally, a user may view the assembled data related to all life categories of a certain user. For example, the user may view all questionnaires associated with all life categories of a certain user or all the tasks associated with all life categories of a certain user.

The process for updating a selected life category for a certain user includes:

Posting a questionnaire, the client and to the team. The questionnaire includes generic questions and questions related to the chosen aspect of life.

Updating aims either by selecting a pre-defined text or by editing a new text.

Update the work plan. The updating includes embedding tasks associated with the life category into the calendar.

The definition of the task includes the selecting of the team member that escorts the task, selecting measures of performance location and frequency.

It should be noted that if the organization in which the rehabilitation process is implemented deals only with one or more selected aspect of life, the system shows only the selected aspect of life that are dealt with by this organization.

The figure shows the drill down process from general point of view into full protocol of each of the life category, which gives substantial possibilities.

Same protocol is used for each life category; some of the content is changed in accordance to life category.

After finalizing the chosen life category, the work plan is generated automatically.

Main periodic assessment is updated from general point of view.

The client is deeply involved and leading the protocol step, the success rate is greatly improved.

What is claimed is:

1. A computerized method for tracking the mental health status of a mental health rehabilitation client, comprising providing a user with access to an electronic device configured to:
   a) retrieve a plurality of client data from a database of mental health rehabilitation clients;
   b) analyze said client data to obtain data related to a predefined mental health issue to track;
   c) prepare a periodic assessment of said analyzed data according to predefined assessment parameters;
   d) display said periodic assessment upon an electronic display device, wherein said periodic assessment provides a user with information on the status of least one mental health rehabilitation client;
   e) populate said database with client data comprising client personal details, pertaining to mental health rehabilitation clients, wherein populating said database comprises entering and periodically updating: client story, client vision, client themes; and client life priorities;
   f) output at least the following queries to a rehabilitation client: request for client to rate client willingness to participate in rehabilitation; request for client to rate client satisfaction; request for client to rate client assessment; and request for client to rate client capability; and store said client rating responses in said database and:
   g) output a query to a rehabilitation client to identify his own needs, aims and objectives; and output said needs aims and objectives into predefined tasks in a mental health rehabilitation schedule for a mental health rehabilitation client.

2. The computerized method of claim 1, wherein said predefined tasks in said outputted mental health rehabilitation schedule, comprise specific tasks related to tracking or assisting a mental health rehabilitation client, wherein said task comprises at least one of the following details: definition of task; timeframe for execution of task; support personnel; level of support needed; location of task; ranking of willingness of client to perform task; ranking of ability of client to execute task; ranking of client skill in execution of a task; ranking of client independence in executing a task; ranking of client independence in performing a task; and ranking of result of client performance of a task.

3. The computerized method of claim 1, wherein said displaying said periodic assessment upon one or more electronic display devices, comprises providing a user with a computerized mental health dashboard related to at least one mental health rehabilitation client.

4. The computerized method of claim 1, wherein said mental health issue tracked and analyzed, comprises at least one member of the following group: a client's ability to perform household tasks; a client's financial status; client integration into a community; and the client's medical health.

5. The computerized method of claim 1, wherein said client data comprising client personal details additionally comprises at least one of the following group: client contacts; organizations providing services and treatment, financial entitlements; prescribed medications; and medical background.

6. The computerized method of claim 1, wherein populating said database comprises entering a client's story comprising entering at least one of: significant childhood events; aspects of family relationships; entering details of influential figures in a client's life; entering financial aspects of a client; mental health professional details; mental health budget details; mental health rehabilitation plan; entering prescribed medications; entering mental health history; entering violence threat level; entering client's strengths; and entering client socioeconomic details.

7. The computerized method of claim 1, wherein said periodic assessment prepared and displayed, comprises outputting a client mental health progress report, comprising at least one of the following details related to client execution of tasks: definition of task; timeframe for execution of task; support personnel; level of support needed; location of task; ranking of willingness of client to perform task; ranking of ability of client to execute task; ranking of client skill in execution of a task; ranking of client independence in executing a task; ranking of client independence in performing a task; ranking of result of client performance of a task; work plan assessment; periodic questionnaire assessment; assessment of client themes and leading factor assessment.

8. The computerized method of claim 1, further comprising sending an electronic alert for a task related to tracking or assisting a mental health rehabilitation client.

9. The computerized method of claim 8, wherein said tasks are linked to an electronic calendar.

10. The computerized method of claim 8, wherein said alert comprises at least one of: a reminder to submit documentation to financial entitlements for a mental health rehabilitation client; and an alert for financial tracking for a mental health rehabilitation client.

11. The computerized method of claim 1, further comprising providing a user with a hyperlink to access information for aiding a preselected mental health rehabilitation client, based on a client classification in said database.

12. The computerized method of claim 1, comprising outputting a client mental health progress report indicating changes in mental health occurring over a predefined time period.

13. The computerized method of claim 1, wherein in step c) said predefined assessment parameters comprise tracking the initiative level of a client, in planning and executing a task.

14. The computerized method of claim 1, wherein said step f) of outputting a mental health rehabilitation schedule comprises generating a work plan, including a plurality of implementation clauses, comprised of task particulars.

15. The computerized method of claim 14, wherein said implementation clauses related to a plurality of life categories.

16. The computerized method of claim 1, wherein in step d) said displayed periodic assessment is a plotted graph.

17. The method of claim 1, wherein said step f) further comprises:
   a) presenting to a user, guidelines related to his mental health life story; said presenting is for assisting said user in inputting said life story;
   b) receiving from a user said life story;
   c) storing said life story in a data repository;
   d) presenting to a user guidelines related to his vision; said presenting is for assisting said user in inputting said vision;

e) receiving from said user said vision;
f) storing said vision in a data repository;
g) presenting to a user a plurality of themes;
h) receiving from the user at least one selected theme from said plurality of themes;
i) storing said at least one selected theme in a data repository;
j) presenting to a user a plurality of life categories;
k) receiving a selection of an at least one selected life categories from said plurality of life categories;
l) storing said selected life categories in said data repository;
m) presenting to said user aims and objectives associated with said selected life category;
n) receiving from a user a selection of an at least one selected aim or objective associated with said plurality of mental health aims and objectives;
o) presenting to a user a presentation for developing a work plan or work plan implementation clause associated with said selected aim or objective;
p) embedding said work plan or said work plan implementation clause in a calendar;
q) presenting to said user a questionnaire associated with said work plan, or said selected aspect of life, or said selected aim or objective;
r) receiving response to said questionnaire;
s) storing said response to said questionnaire in a data repository; and
t) repeating steps q), r) and s) for providing measurements for periodically assessing improvement of a client.

18. A system for rapid visual tracking of the mental health status of a mental health rehabilitation client, said system comprising:
computer associated peripherals;
a processor interacting with said peripherals, said processor including a memory device, and a driver; said processor being in communication with said memory device, and being configured to:
a) retrieve a plurality of client data from a database of mental health rehabilitation clients;
b) analyze said client data to obtain data related to a predefined mental health issue to track;
c) prepare a periodic assessment of said analyzed data according to predefined assessment parameters;
d) display said periodic assessment upon an electronic display device, wherein said periodic assessment provides a user with information on the status of least one mental health rehabilitation client;
e) populate said database with client data comprising client personal details, pertaining to mental health rehabilitation clients, wherein populating said database comprises entering and periodically updating: client story, client vision, client themes; and client life priorities;
f) output at least the following queries to a rehabilitation client: request for client to rate client willingness to participate in rehabilitation; request for client to rate client satisfaction; request for client to rate client assessment; and request for client to rate client user capability; and store said client rating responses in said database and:
g) output a query to a rehabilitation client to identify his own needs, aims and objectives, and output said needs aims and objectives into predefined tasks in a mental health rehabilitation schedule for a mental health rehabilitation client.

* * * * *